(12) United States Patent
Miyake

(10) Patent No.: US 7,248,545 B2
(45) Date of Patent: Jul. 24, 2007

(54) OPTICAL PICKUP DEVICE

(75) Inventor: Takahiro Miyake, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 512 days.

(21) Appl. No.: 10/128,023

(22) Filed: Apr. 23, 2002

(65) Prior Publication Data

US 2003/0090968 A1    May 15, 2003

(30) Foreign Application Priority Data

Apr. 24, 2001   (JP)   ............................... 2001-126678

(51) Int. Cl.
*G11B 7/09* (2006.01)
(52) U.S. Cl. ................ 369/44.41; 369/44.36; 369/44.37
(58) Field of Classification Search ............ 369/44.26, 369/44.28, 44.29, 44.36, 44.37, 53.1, 59.11, 369/112.04, 112.12, 49.11, 44.41, 53.23, 369/44.35, 53.22, 53.35, 124.12, 44.32, 53.19, 369/53.28, 53.33, 124.03, 122.05

See application file for complete search history.

(56) References Cited

U.S. PATENT DOCUMENTS

| | | | |
|---|---|---|---|
| 5,212,675 A * | 5/1993 | Yoshino et al. | 369/44.36 |
| 5,428,595 A * | 6/1995 | Yoshida et al. | 369/112.04 |
| 5,671,199 A * | 9/1997 | Nishikawa | 369/44.26 |
| 5,875,157 A * | 2/1999 | Sasaki et al. | 369/44.29 |
| 6,097,684 A * | 8/2000 | Oohata et al. | 369/53.22 |
| 6,137,758 A * | 10/2000 | Nemoto | 369/44.29 |
| 6,388,963 B1 * | 5/2002 | Tanaka | 369/44.26 |
| 6,400,664 B1 * | 6/2002 | Shimano et al. | 369/44.37 |
| 6,438,077 B1 * | 8/2002 | Mashimo | 369/44.28 |

(Continued)

FOREIGN PATENT DOCUMENTS

JP         05-054415         3/1993

(Continued)

OTHER PUBLICATIONS

Japanese Office Action dated Dec. 16, 2003.

(Continued)

*Primary Examiner*—Andrea Wellington
*Assistant Examiner*—Kim Kwok Chu
(74) *Attorney, Agent, or Firm*—David G. Conlin; John J. Penny, Jr.; Edwards Angell Palmer & Dodge LLP

(57) ABSTRACT

According to the present invention, an optical pickup device forms one main spot, a first subspot, and a second subspot by irradiation of light on an optical disk having a groove part and a land part. The optical pickup device includes operation circuits which indicate a deviation between each of the optical spots and a track, and α detecting means for detecting such an α value that a difference in absolute value between SPP1 and αSPP2 falls in a preset range, where an AC amplitude of a push-pull signal of the first subspot is SPP1, and an AC amplitude of a push-pull signal of the second subspot is SPP2, wherein SPP1−αSPP2 (α is a constant) is a land/groove discriminating signal. With this, in the optical pickup device for recording and reproducing information on/from the optical disk having a land/groove part, it is possible to generate a land/groove discriminating signal and a tracking error signal without an offset, thereby performing excellent tracking control.

16 Claims, 14 Drawing Sheets

U.S. PATENT DOCUMENTS

| | | | |
|---|---|---|---|
| 6,594,210 B2 * | 7/2003 | Kumagai | 369/47.17 |
| 6,687,201 B2 * | 2/2004 | Ma et al. | 369/44.28 |
| 6,700,842 B1 * | 3/2004 | Nishi | 369/44.41 |
| 6,781,930 B2 * | 8/2004 | Fukumoto | 369/44.32 |

FOREIGN PATENT DOCUMENTS

| | | |
|---|---|---|
| JP | 05-128548 | 5/1993 |
| JP | 07-320287 | 12/1995 |
| JP | 09-081942 | 3/1997 |
| JP | 10-003672 | 1/1998 |
| JP | 11-045451 | 2/1999 |
| JP | 11-250475 | 9/1999 |

OTHER PUBLICATIONS

English Translation of Japanese Office Action dated Dec. 16, 2003.

* cited by examiner

RADIAL DIRECTION

CONVENTIONAL optical disks

FIG. 9 (a)
CONVENTIONAL
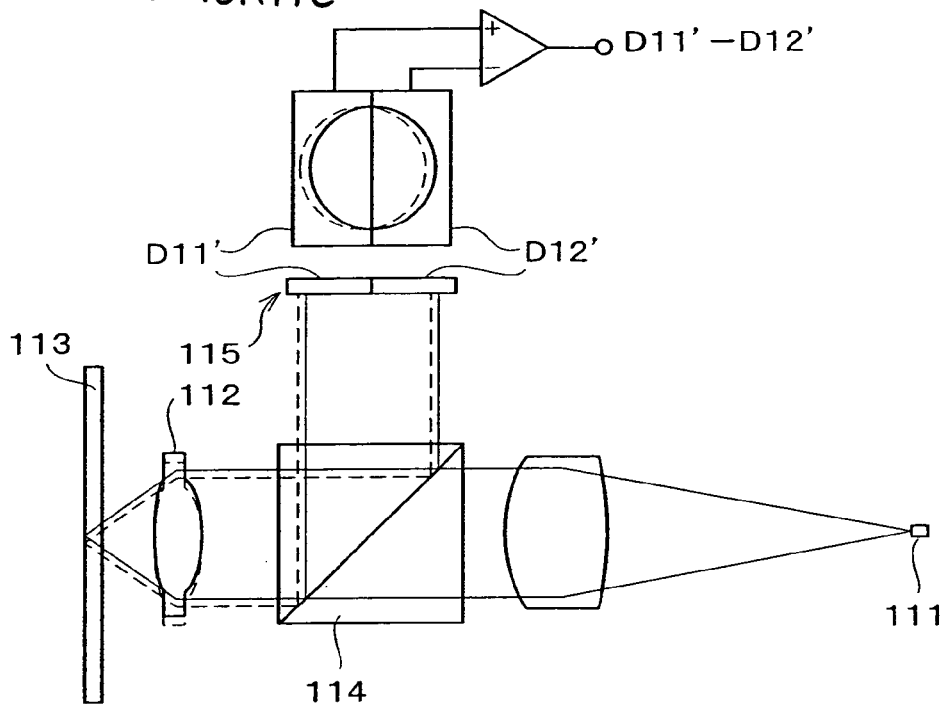
FIG. 9 (b)
CONVENTIONAL
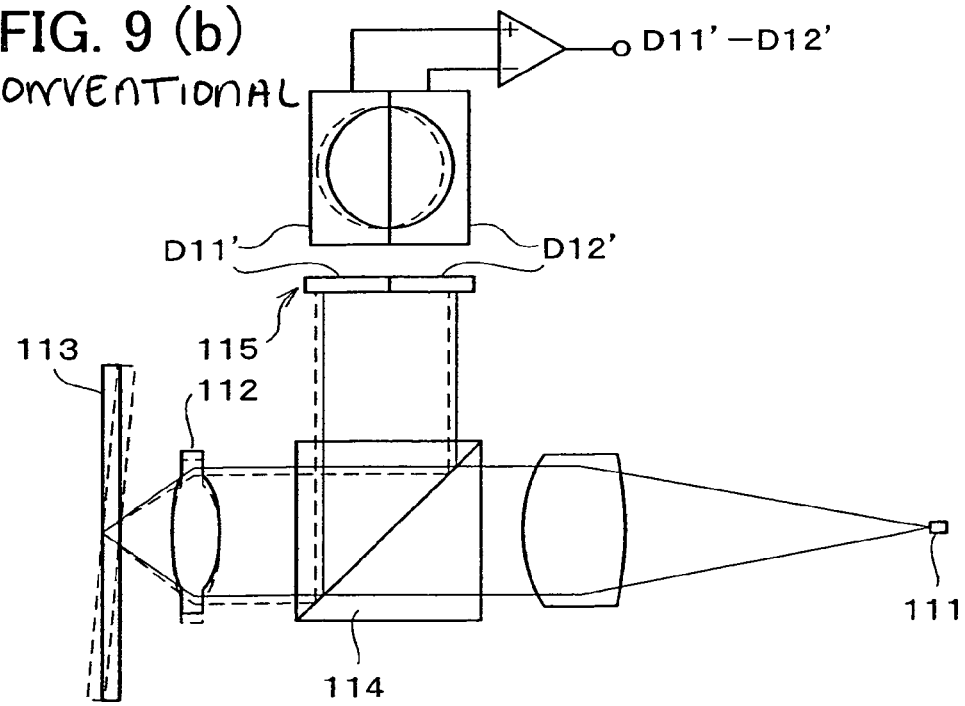

FIG. 10 (a)
CONVENTIONAL
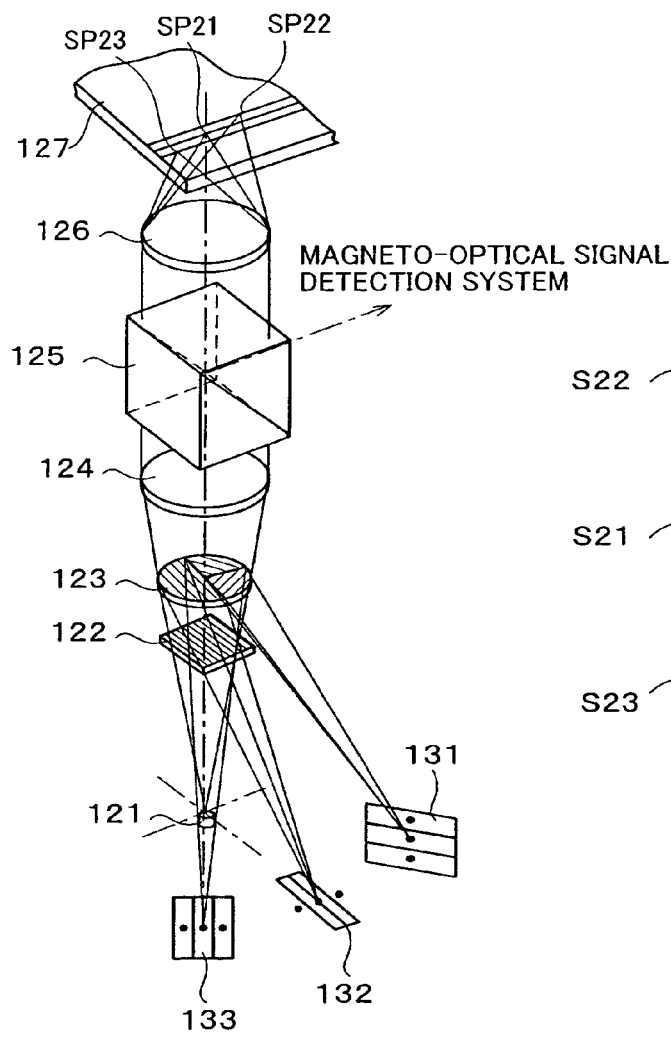
FIG. 10 (b)
CONVENTIONAL
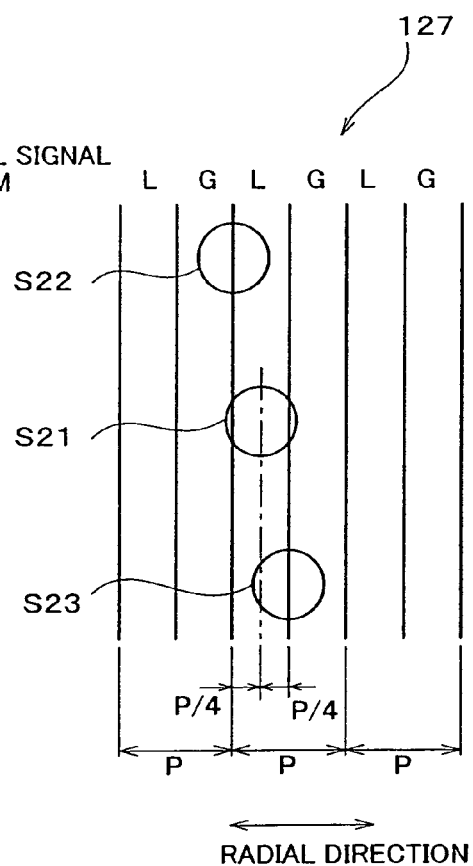
RADIAL DIRECTION

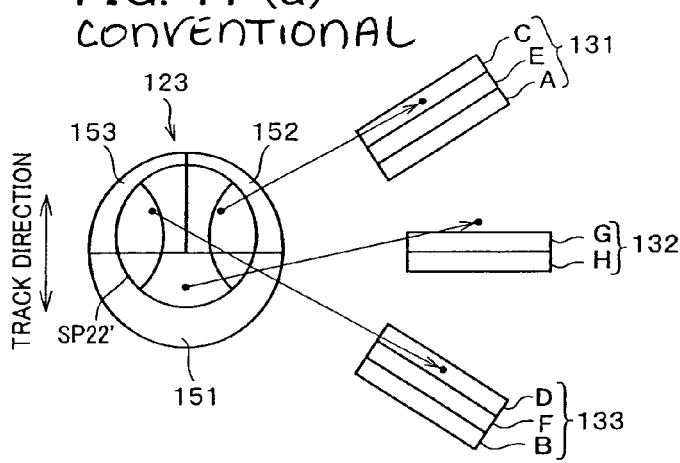
FIG. 11 (a) CONVENTIONAL
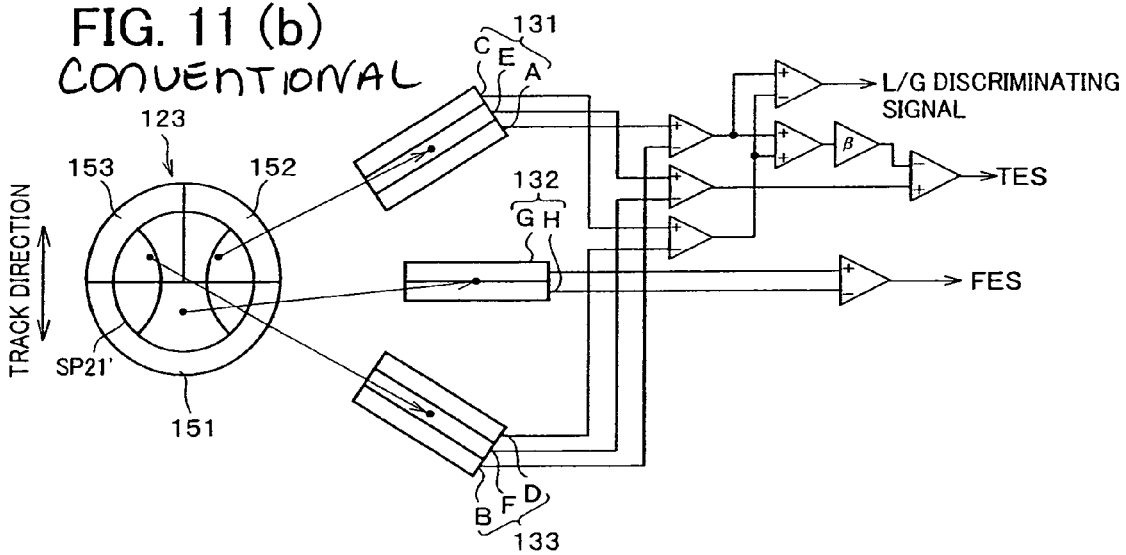
FIG. 11 (b) CONVENTIONAL
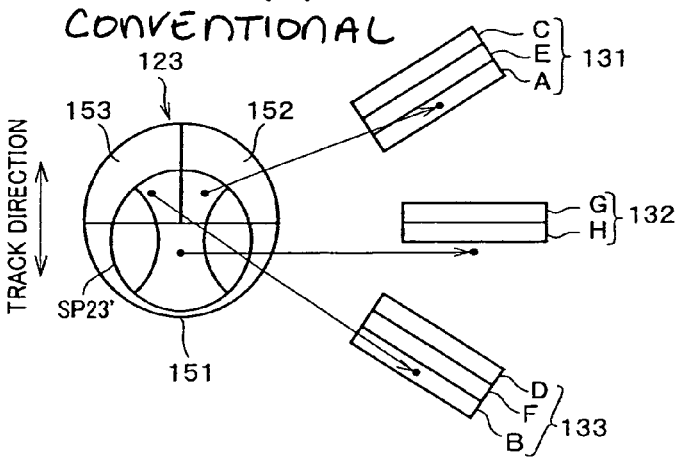
FIG. 11 (c) CONVENTIONAL

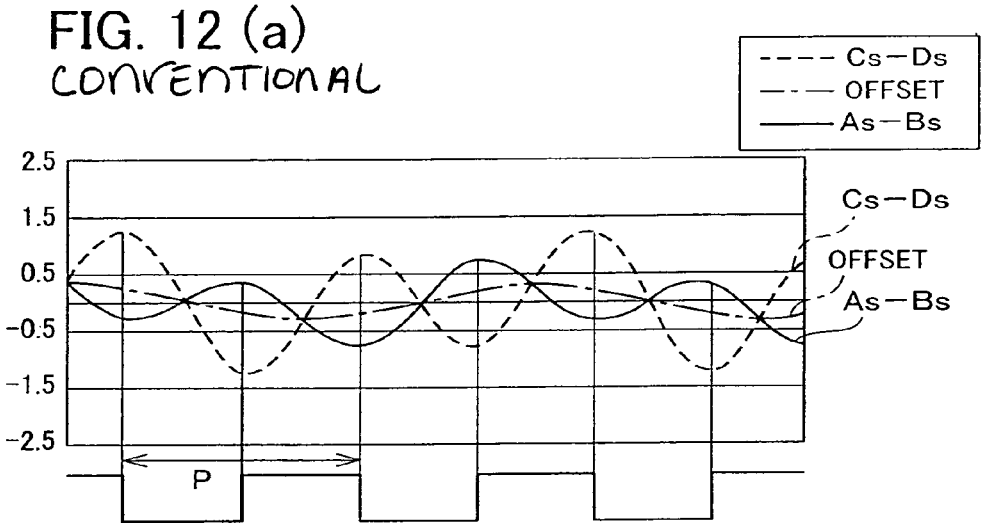
FIG. 12 (a) CONVENTIONAL
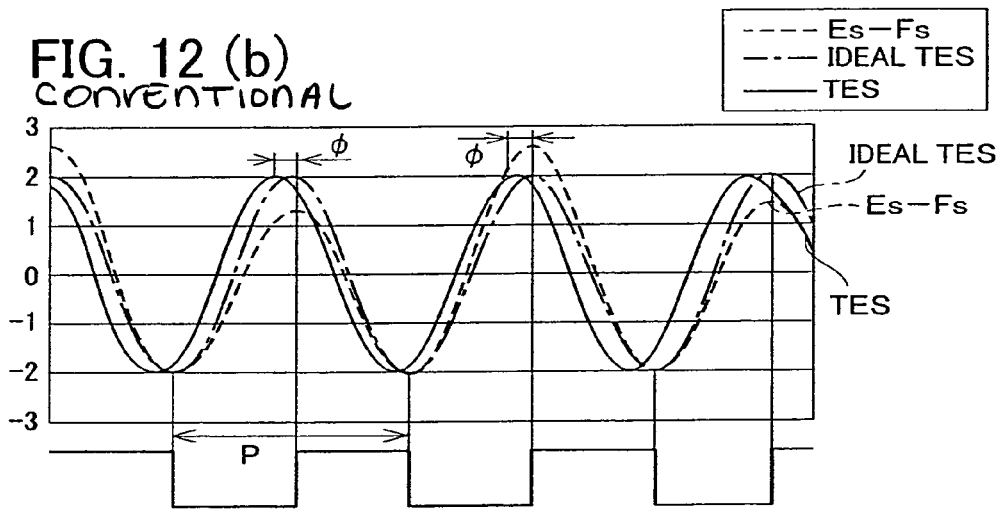
FIG. 12 (b) CONVENTIONAL
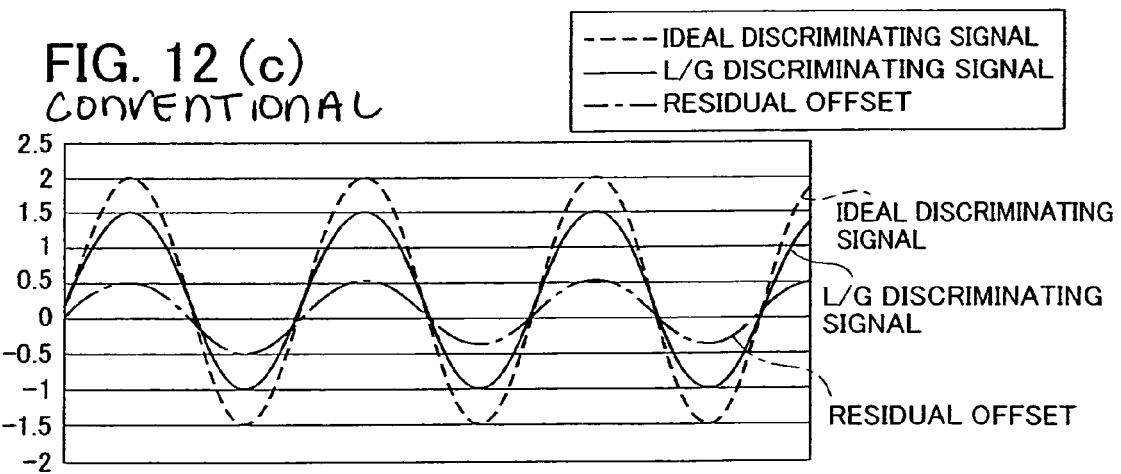
FIG. 12 (c) CONVENTIONAL

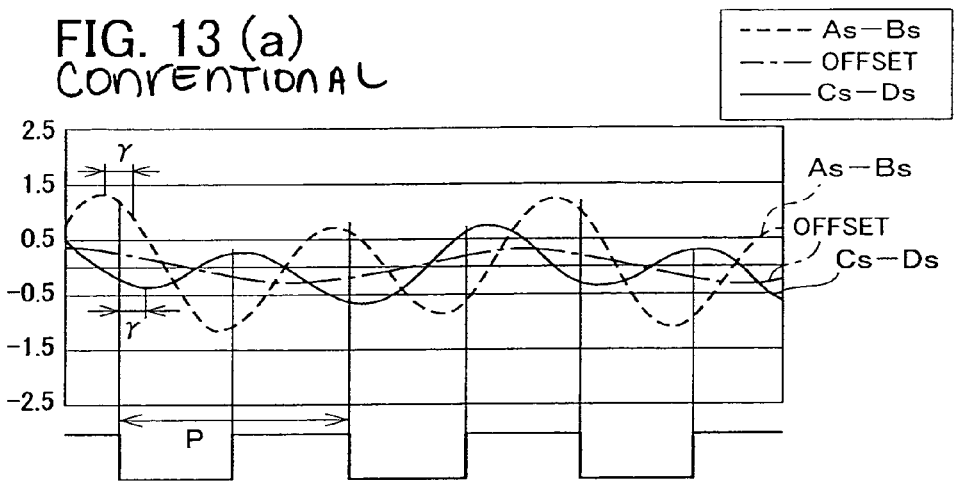
FIG. 13 (a) CONVENTIONAL
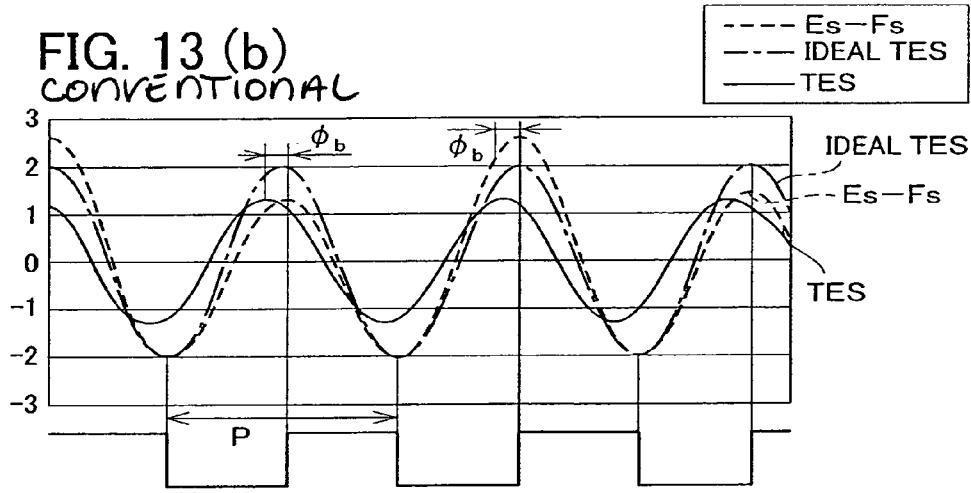
FIG. 13 (b) CONVENTIONAL
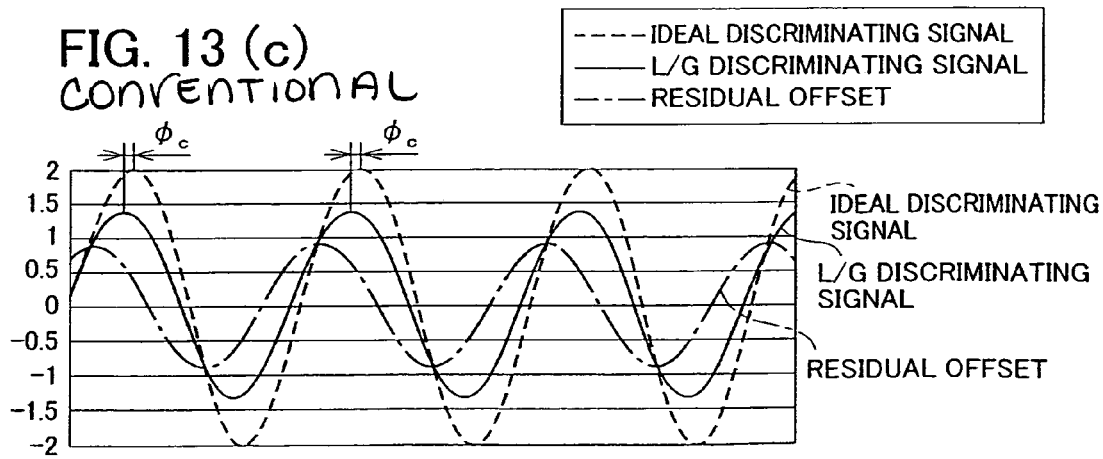
FIG. 13 (c) CONVENTIONAL

OPTICAL PICKUP DEVICE

FIELD OF THE INVENTION

The present invention relates to an optical pickup device used in optical reproducing apparatuses which reproduce a read-only optical disk such as a compact disk (CD) and a laser disk (LD), or in optical recording and reproducing apparatuses which record and reproduce information with respect to an optical disk such as a write-once type or a rewritable type optical disk.

BACKGROUND OF THE INVENTION

An optical pickup must trace accurately tracks of 1.6 μm intervals in an optical disk such as a CD. Accordingly, in order to ensure stable signal detection, control at one-tenth or less a track width is required, and a control operation (tracking servo) is generally performed with a tolerance of 0.1 μm or less.

In an optical pickup device, this control operation is performed by moving an objective lens back and forth in a horizontal direction, and it is necessary to detect a signal (tracking error signal) which indicates a direction (right or left) and an amount of the movement.

Now, a three-beam method or a push/pull method has been known as a tracking servo system of an optical pickup device.

FIG. 8 is an explanatory drawing of the three-beam method. As shown in FIG. 8, a main beam SP11 is converged on an optical disk 101. On the both sides of the main beam SP11 are converged subbeams SP12 and SP13 for detecting a tracking error signal.

In this method, when the converged main beam SP11 traces accurately the track, output of the subbeam SP12 is equal to that of the subbeam SP13. On the other hand, when a tracking deviation occurs in converging the main beam SP11, output of the subbeam SP12 becomes different from that of the subbeam SP13.

Here, in the three-beam method, the tracking error signal is a differencial signal D11-D12 which is obtained from intensities D11 and D12 detected by a photodetector with respect to disk-reflected light of the respective subbeams SP12 and SP13.

However, in the three-beam method, the subbeams SP12 and SP13 to be a tracking error signal are spaced by a large distance. This causes a difference in quantity of reflected light between the subbeams SP12 and SP13 even when tracking is performed from a part where no information is recorded to a part where information is recorded in the optical disk 101 without the main beam SP11's tracking deviation, as shown in FIG. 8. Accordingly, with respect to the differential signal D11-D12, a problem arises that a tracking offset occurs due to the difference in quantity of reflected light, not due to a tracking deviation.

FIG. 9(a) and FIG. 9(b) are drawings for explaining the push-pull method. As shown in FIG. 9(a) and FIG. 9(b), the light emitted by a laser 111 is converged through an objective lens 112 onto a pit on an optical disk 113. The converged light is diffracted and reflected by the pit on the optical disk 113, and are incident on the objective lens 112 again. The reflected light incident on the objective lens 112 is incident via a beam splitter 114 on a dichotomized photodetector 115 to be detected. The dichotomized photodetector 115 has a photodetection face of two equally-divided areas and is set so that when the light beam is properly positioned with respect to the pit on the disk, two (right and left) intensities of reflected light respectively detected by the two photodetection areas become equal to each other.

Thus, if the light beam is properly positioned with respect to the pit, intensity distributions of the reflected light are indicated equally on the right and left areas of the photodetection face. That is, if the light beam is properly positioned with respect to the pit on the disk, the two photodetection areas (left and right) of the dichotomized photodetector 115 detects reflected light of equal intensity distribution. However, a deviation from the proper position causes asymmetric intensity distributions of the reflected light on the right and left areas of the dichotomized photodetector 115. That is, when the position of the light beam deviates from the pit, two (left and right) intensity distributions of reflected light detected by the two areas of the photodetection face become asymmetrical. Here, in the push-pull method, the tracking error signal is defined to be a differential signal D11'-D12' which is obtained from detected intensities D11' and D12' of reflected light on the two detection areas (right and left).

However, the push-pull method has the following problem. In the push-pull method, a tracking error signal is produced by detection of a difference of light quantity distributions of reflected light from the optical disk 113 on the right side and left side of the dichotomized photodetector 115. That is, a tracking error signal is obtained by detection of a difference of intensity distributions of reflected light respectively detected on the two photodetection areas of the dichotomized photodetector 115. However, in the tracking of an optical disk, in case where the objective lens 112 moves in the radial direction, there are cases where a light axis of reflected light from the optical disk 113 shifts, and accordingly a beam center shifts from the center of the photodetection face of the dichotomized photodetector 115, as shown in FIG. 9(a). In addition, in case where a face of the optical disk 113 has a tilt, the reflected light from the optical disk 113 may return to the objective lens 112 with an angle, thereby shifting the center of the reflected light with respect to the objective lens 112, as shown in FIG. 9(b).

Thus, in both cases, there is a problem that despite no tracking deviation, a differential signal D11'-D12' from the dichotomized photodetector 115 is offset to cause inaccurate tracking.

In light of this problem, Japanese Laid-Open Patent Publication No.45451/1999 (Tokukaihei 11-45451, published on Feb. 16, 1999) discloses a technique to solve this problem. FIG. 10(a) is a perspective view illustrating an optical pickup optical system of this conventional technology. As shown in FIG. 10(a), the light emitted from a semiconductor laser 121 is split by a first diffraction element 122 into three light beams, i.e., a zeroth-order light beam forming a main spot on an optical disk 127 and ±first-order light beams forming two subspots. Then, after passing through a second diffraction element 123, the three light beams are converted by a collimator lens 124 into parallel light beams. Furthermore, after passing through a beam splitter 125, these three light beams form on the optical disk 127 via an objective lens 126 a main spot SP21 based on the zeroth-order light beam and two subspots SP22 and SP23 based on the ±first-order light beams. After that, the three light beams are diffracted and reflected by a pit on the optical disk 127. Then, the reflected three light beams become parallel light beams again through the objective lens 126. Although these three parallel light beams pass through the beam splitter 125, these light beams are partially reflected by the beam splitter 125 and led to a magneto-optical signal detection system. The light beam led to the magneto-optical signal detection system is converted into electrical signals by elements such as an analyzer and a light receiving element for reproducing signals of the optical disk 127. Information recorded in the optical disk 127 is reproduced in this manner.

On the other hand, the other light beams having passed through the beam splitter 125 also pass through the collimator lens 124 and are diffracted by the diffraction element 123. The diffracted first-order light beam is received by light receiving elements 131 to 133 to be detected as a servo signal (focus error signal and tracking error signal, hereinafter referred to as FES and TES, respectively) and as an optical disk's land/groove (L/G) discriminating signal.

The FES is a signal for detecting a direction (upward or downward) and an amount of movement of the objective lens 126 in the focus direction. The TES is a signal for detecting a direction (right or left) and an amount of movement of the objective lens 126 in the tracking direction. Furthermore, a land means a raised part of the optical disk which defines the track. A groove means a recessed part of the optical disk which defines the track.

Next, in this optical system, the following will explain a positional relationship between the main spot SP21 and the subspots SP22 and SP23 on the optical disk 127, and light-receiving regions in the light receiving elements 131 to 133 for receiving light diffracted by the diffraction element 123.

As shown in FIG. 10(*b*), the main spot SP21 and the subspots SP22 and SP23 are placed symmetrically on the optical disk 127 at the intervals one-forth (P/4) of a track pitch. Note that, L represents a land, while G represents a groove. Therefore, a track pitch is a width of one land width and one groove width added together.

As shown in FIG. 11(*a*) through FIG. 11(*c*), the diffraction element 123 has divided three regions, i.e., regions 151 to 153. The diffraction element 123 is divided by a division line in the radial direction of the optical disk into two regions, i.e., the region 151 and the other region (152+153). Further, this other region is divided by a division line in the track direction of the optical disk into the regions 152 and 153.

Now, FIG. 11(*a*) shows a diffraction pattern SP22′ on the diffraction element 123 by reflected light from the subspot SP22 on an optical disk. In the diffraction pattern SP22′, among the diffracted light beams of the diffraction element 123, the light diffracted in the region 151 is not received. The light diffracted in the region 152 is received by a light receiving section C which is one of the divided sections of the light receiving element 131, while the light diffracted in the region 153 is received by a light receiving section D which is one of the divided sections of the light receiving element 133.

Next, FIG. 11(*b*) shows a diffraction pattern SP21′ on the diffraction element 123 by reflected light from the main spot SP21 on an optical disk. In the diffraction pattern SP21′, among the diffracted light beams of the diffraction element 123, the light diffracted in the region 151 is converged on the division line between light receiving sections G and H of the light receiving element 132. The light diffracted in the region 152 is received by a light receiving section E which is one of the divided sections of the light receiving element 131, while the light diffracted in the region 153 is received by a light receiving section F which is one of the divided sections of the light receiving element 133.

Furthermore, FIG. 11(*c*) shows a diffraction pattern SP23′ on the diffraction element 123 by reflected light from the subspot SP23 on an optical disk. In the diffraction pattern SP23′, among the diffracted light beams of the diffraction element 123, the light diffracted in the region 151 is not received. The light diffracted in the region 152 is received by a light receiving section A which is one of the divided sections of the light receiving element 131, while the light diffracted in the region 153 is received by a light receiving section B which is one of the divided sections of the light receiving element 133.

Now, when the outputs of light receiving sections A to H of the receiving elements 131 to 133 are denoted as As to Hs, respectively, servo signals are found by the following operations:

FES=Gs-Hs $$TES=(Es\text{-}Fs)-\beta[(As\text{-}Bs)+(Cs\text{-}Ds)] \quad (1)$$

($\beta$ is a constant)

L/G discriminating signal=(As-Bs)−(Cs-Ds)

(L/G: land/groove)

In TES, $\beta$ is a constant which represents an intensity ratio of the main spot SP21 to the subspots SP22 and SP23.

However, the TES and L/G discriminating signal have the following problems.

Equation (1) finds TES by using that (As-Bs) and (Cs-Ds) are sine waves whose wavelengths are shifted by a phase angle of $\pi/2$ with respect to (Es-Fs), leading and lagging (Es-Fs), respectively, and by cancelling (Es-Fs) by a sum of (As-Bs) and (Cs-Ds).

However, as shown in FIGS. 12(*a*) and 12(*b*), each of (As-Bs), (Cs-Ds), and (Es-Fs) has a signal waveform in the form of a sine wave, with a period of track pitch P. A signal amplitude is shown as |As-Bs|<|Cs-Ds|. The following will explain the reason why a signal amplitude is shown as |As-Bs|<|Cs-Ds|. The diffraction pattern SP22′ in FIG. 11(*a*) and the diffraction pattern SP23′ in FIG. 11(*c*) are shifted away from each other in the track direction. In other words, the diffraction pattern SP22′ shifts toward upstream in the track direction relative to the diffraction pattern SP23′. With this, with respect to a beam diffraction area in the regions 152 and 153, the area of the diffraction pattern SP22′ is larger than that of the diffraction pattern SP23′. Accordingly, as a signal, the operation (Cs-Ds) of the light receiving elements 131 to 133 in FIG. 11(*a*) is larger than the operation (As-Bs) of the light-receiving elements 131 to 133 in FIG. 11(*c*). In addition, a difference in size of signals may also occur due to a sensitivity variation of thee light receiving elements 131 to 133, a variation of the diffraction element 123's diffraction efficiency, or a variation of the circuits performing the operations. Note that, as shown in FIG. 12(*a*), each of the signals in this case has the same offset component generated by a tilt of the optical disk, or by a change of beam spot positions on the diffraction element as a result of a shift of the objective lens.

Therefore, the operation in the second term of equation (1) for determining TES, that is, $$\beta[(As\text{-}Bs)+(Cs\text{-}Ds)] \quad (2),$$

becomes |$\beta$(As-Bs)|<|$\beta$(Cs-Ds)|. As a result, as shown in FIG. 12(*c*), the operation result of (2) includes an additional residual offset due to the (Cs-Ds) operation component other than the tracking offset.

Therefore, in the operation of equation (1) in which the result of operation (2) is subtracted from a push-pull signal (Es-Fs) having a tracking offset due to the main beam, while it is possible to cancel an offset component generated by a tilt of the optical disk, or a variation of beam spot positions on the diffraction element as a result of a shift of the objective lens, a new Cs-Ds component is added as an additional residual offset.

As a result, as shown in FIG. 12(b), there is a problem that the additional residual offset is added to TES, and the signal phase of the TES shifts by ø from the proper signal phase, so that accurate tracking control cannot be performed.

Furthermore, the following will explain a problem caused by a tracking error signal when an adjustment error occurs in positioning subbeams on the optical disk when assembling and adjusting the pickup.

In a pickup which is designed to project the beams at the intervals of n/4 (n is odd number) of the track pitch, for example, one-forth (P/4) of the track pitch as shown in FIG. 6(a), or five-fourths (5P/4) of the track pitch as shown in FIG. 6(b), the following considers the case where positions of the subbeams are adjusted so as to be δ away from the ideal position. Here, explanations are given based on a principle of servo signal detection using the respective signal waveforms, with reference to FIGS. 13(a) through 13(c).

As shown in FIGS. 13(a) and 13(b), each of (As-Bs), (Cs-Ds), and (Es-Fs) has a signal waveform in the form of a sine wave, with a period of track pitch P. Here, (As-Bs) and (Cs-Ds) in the second term of equation (1) for determining TES have signal amplitudes different from that of the ideal waveform and have a phase difference of ±γ with respect to the ideal waveform, as shown in FIG. 13(a).

As a result, the operation result of $$\beta[(As-Bs)+(Cs-Ds)] \quad (2)$$

includes a residual offset which is out of phase from (Es-Fs) as shown in FIG. 13(c).

As a result, there is a problem that the residual offset is added to the TES, and the signal phase of the TES is out of phase by $ø_b$ from the ideal TES phase, so that accurate tracking control cannot be performed.

Furthermore, the L/G discriminating signal is found by the operation of (As-Bs) and (Cs-Ds). However, since (As-Bs) and (Cs-Ds) are out of phase, as shown in FIG. 13(c), the phase of the L/G discriminating signal is out of phase by $ø_c$ from the ideal discriminating signal, so that accurate land/groove discrimination cannot be performed. Accordingly, the tracking servo system cannot perform a pull-in operation.

Incidentally, the residual offset tends to become larger as the adjustment error becomes large in positioning subbeams on the optical disk when assembling and adjusting the pickup. Therefore, conventional pickups must be assembled so that an adjustment error in positioning subbeams becomes as small as possible. This means greater difficulties in assembling and lower yield, resulting in rise in manufacturing cost.

SUMMARY OF THE INVENTION

In view of the above conventional problems, an object of the present invention is to provide an optical pickup device, using a diffraction element, which can be provided in a reduced size and thickness, which causes no offset in a tracking error signal, and which can discriminate between a land and a groove, even when there is a variation in sensitivity of a light receiving element, rotation efficiency of a diffraction element, or operation circuits.

To achieve the above object, an optical pickup device according to the present invention for reproducing information from an optical disk having a track which is provided with a groove part which is a recessed part and a land part which is a raised part, in which one main spot, a first subspot, and a second subspot are formed by irradiation of light on the optical disk, includes:

means for generating a push-pull signal which indicates a deviation between each of the spots and the track; and α detecting means for detecting such an α value that a difference in absolute value between SPP1 and αSPP2 falls in a preset range, where a push-pull signal of the first subspot is SPP1, and a push-pull signal of the second subspot is SPP2, wherein:

SPP1−αSPP2 (α is a constant) is a land/groove discriminating signal.

This makes it possible to obtain an accurate signal waveform having no phase difference with respect to SPP1−αSPP2 (α is a constant), thereby obtaining an ideal land/groove discriminating signal from a difference between SPP1 and αSPP2.

The above arrangement makes it possible to remove an land/groove discriminating offset caused by a difference in magnitude of push-pull signals from the subspots in case of an adjustment error of subbeam projection positions with respect to the disk track, thereby accurately distinguishing between the lands and grooves all the time and performing an excellent pull-in operation of the tracking servo.

Further, to achieve the above object, an optical pickup device according to the present invention for reproducing information from an optical disk having a track which is provided with a groove part which is a recessed part and a land part which is a raised part, in which one main spot, a first subspot, and a second subspot are formed by irradiation of a light beam upon the optical disk, includes:

means for generating a push-pull signal which indicates a deviation between each of the spots and the track; and α detecting means for detecting such an α value that a difference in absolute value between SPP1 and αSPP2 falls in a preset range, where a push-pull signal of the main spot is MPP, a push-pull signal of the first subspot is SPP1, a push-pull signal of the second subspot is SPP2, wherein:

MPP−β(SPP1+αSPP2) (α and β are constants) is a tracking error signal.

By the opposite phase of the AC signal amplitudes of the SPP1 and αSPP2 and by a difference in absolute value of the signal amplitudes within a preset range, the SPP1 and αSPP2 are cancelled in the operation β(SPP1+αSPP2). In a result of the operation, only a tracking offset component remains.

Therefore, when (SPP1+αSPP2) is subtracted from the MPP of the main beam having a tracking offset, a tracking offset component can be cancelled completely. This makes it possible to obtain a tracking signal having no offset, and to perform accurate tracking control.

The above arrangement makes it possible to adjust an AC amplitude of SPP2 so as to generate an accurate tracking error signal all the time even in the presence of a variation in size of SPP1 and SPP2 from the subspots or an adjustment error of subbeam projection positions with respect to the disk track, thereby realizing an excellent tracking servo.

For a fuller understanding of the nature and advantages of the invention, reference should be made to the ensuing detailed description taken in conjunction with the accompanying drawings.

BRIEF DESCRIPTION OF THE DRAWINGS

FIGS. 5(a) through 5(c) are drawings illustrating signal waveforms of an optical pickup device according to the present invention, in which FIG. 5(a) shows (As-Bs) and α(Cs-Ds), FIG. 5(b) shows TES and (Es-Fs), FIG. 5(c) shows an L/G discriminating signal, wherein the vertical axis in the drawings represents amplitude quantity, and the horizontal axis in the drawings represents optical spot positions on the optical disk.

FIG. 6(a) and FIG. 6(b) are explanatory drawings illustrating a relationship between spot positions on an optical disk with respect to an optical pickup device according to the present invention, in which FIG. 6(a) shows the case where a spot interval is approximately ¼ of a track pitch, and FIG. 6(b) shows the case where a spot interval is approximately ⅝ of a track pitch.

FIGS. 7(a) through 7(c) are drawings illustrating signal waveforms of an optical pickup device according to the present invention, in which FIG. 7(a) shows (As-Bs) and α(Cs-Ds), FIG. 7(b) shows TES and (Es-Fs), FIG. 7(c) shows an L/G discriminating signal, wherein the vertical axis in the drawings represents amplitude quantity, and the horizontal axis in the drawings represents optical spot positions on the optical disk.

FIGS. 9(a) and 9(b) are explanatory drawings illustrating signal detection by a push-pull method in a conventional optical pickup device, in which FIG. 9(a) shows the case where an objective lens is shifted, and FIG. 9(b) shows the case where a face of an optical disk is tilted.

FIG. 10(a) is a perspective view illustrating an optical system in a conventional optical pickup device, and FIG. 10(b) is an explanatory drawing illustrating spot positions on an optical disk.

FIG. 11(a) is an explanatory drawing illustrating a diffraction pattern SP22' on a diffraction element 123 by the reflected light from a subspot SP22 on an optical disk of a conventional example, FIG. 11(b) is an explanatory drawing illustrating a diffraction pattern SP21' on the diffraction element 123 by the reflected light from a main spot SP21 on the optical disk of a conventional example, and FIG. 11(c) is an explanatory drawing showing a diffraction pattern SP23' on the diffraction element 123 by the reflected light from a subspot SP23 on the optical disk of a conventional example.

FIGS. 12(a) through 12(c) are drawings illustrating signal waveforms of a conventional optical pickup device, in which FIG. 12(a) shows (As-Bs) and (Cs-Ds), FIG. 12(b) shows TES and (Es-Fs), FIG. 12(c) shows an L/G discriminating signal, wherein the vertical axis in the drawings represents amplitude quantity, and the horizontal axis in the drawings represents optical spot positions on the optical disk.

FIGS. 13(a) through 13(c) are drawings illustrating signal waveforms of a conventional optical pickup device, in which FIG. 13(a) shows (As-Bs) and (Cs-Ds), FIG. 13(b) shows TES and (Es-Fs), FIG. 13(c) shows an L/G discriminating signal, wherein the vertical axis in the drawings represents amplitude quantity, and the horizontal axis in the drawings represents optical spot positions on the optical disk.

DESCRIPTION OF THE EMBODIMENTS

Referring to FIG. 1 to FIG. 7, the following will explain an embodiment of the present invention.

Figure 2A:
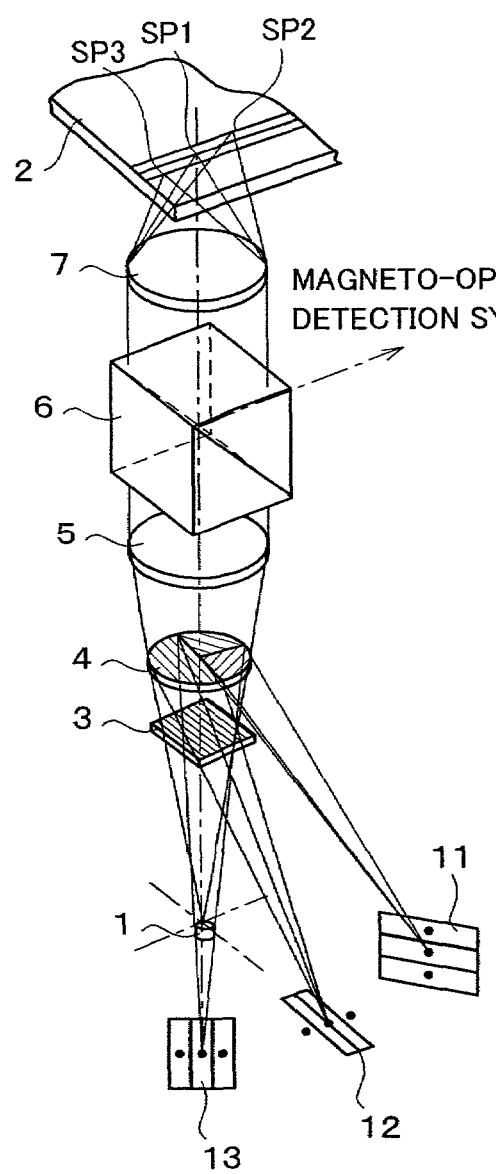
FIG. 2(a) is a perspective view illustrating an optical system in the optical pickup device of the present invention.

FIG. 2(a) is a perspective view illustrating an optical system in an optical pickup device of the present embodiment. Between a semiconductor laser 1 as a light source and an optical disk 2 are disposed a first diffraction element 3, a second diffraction element 4, a collimator lens 5, a beam splitter 6, and an objective lens 7 in order from the semiconductor laser side, centered by an optical axis.

The first diffraction element 3 and the second diffraction element 4, which are dispersing elements utilizing the diffraction effect of light, function to disperse incident light. The optical disk 2 has a track which is defined by a groove part, which is a recessed part, and a land part, which is a raised part, of approximately the same width. The collimator lens 5 functions to convert emitted laser light into parallel laser light. The beam splitter 6 is an optical element which divides incident light. The objective lens 7 functions to converge the laser beam to a minute spot on the optical disk 2.

Now, the following will explain a principle of detection of a focus error signal (FES), a tracking error signal (TES), and an L/G (land/groove) discriminating signal in the present embodiment.

As shown in FIG. 2(a), the emitted light from the semiconductor laser 1 is split by the first diffraction element 3 into three light beams, i.e., a zeroth-order light beam forming a main spot and ±first-order light beams forming two subspots on the optical disk 2.

Then, after passing through the second diffraction element 4, the three light beams are converted by the collimator lens 5 into parallel light beams, and pass through the beam splitter 6. The zeroth-order light beam and the ±first-order light beams, each of which is generated by the first diffraction element 3, form a main spot SP1 and two subspots SP2 and SP3 (a first subspot and a second subspot), respectively, on the optical disk 2 via an objective lens 7.

The three light beams projected on the optical disk 2 are reflected back into the objective lens 7 and become parallel light beams. Although these three parallel light beams pass through the beam splitter 6, the light beams are partially reflected by the beam splitter 6 and into a magneto-optical signal detection system. The light led to the magneto-optical signal detection system is converted into electrical signals by elements such as an analyzer or a light receiving element for reproducing signals from the optical disk 2. Information recorded in the optical disk 2 is reproduced as audio and image in this manner.

On the other hand, the light beams having passed through the beam splitter 6 also passes through the collimator lens 5 and are diffracted by the diffraction element 4. The first-order light beam produced by diffraction is received by light receiving elements 11 to 13 to be detected as a servo signal (focus error signal and tracking error signal, hereinafter referred to as FES and TES, respectively) and an optical disk's land/groove (L/G) discriminating signal.

Next, in this optical system, the following will explain a positional relationship between the main spot SP1 and the subspots SP2 and SP3 on the optical disk 2, and light-receiving regions in the light receiving elements 11 to 13 for receiving the light diffracted by the diffraction element 4.

Figure 2B:
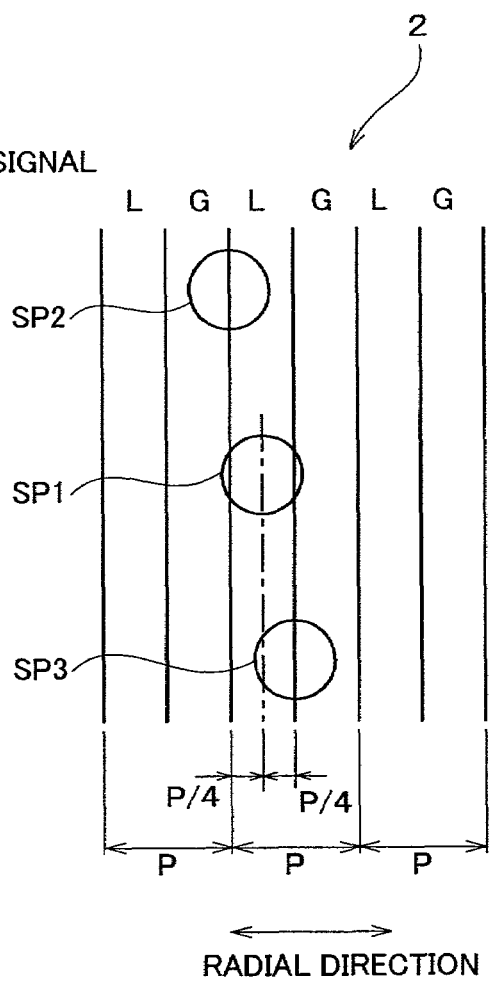
FIG. 2(b) is an explanatory drawing illustrating spot positions on an optical disk.
Figure 3:
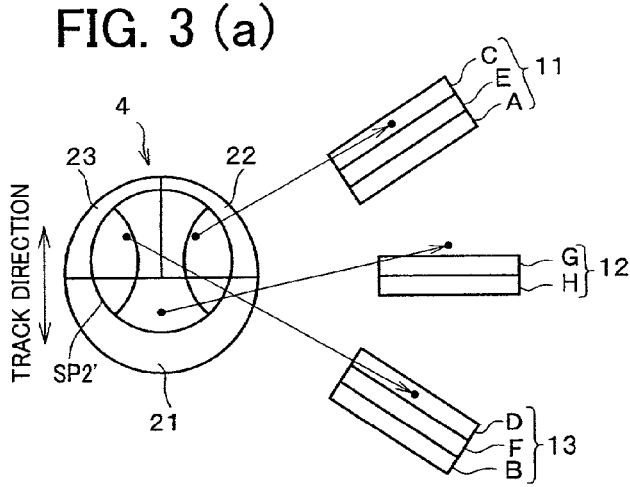
FIG. 3(a) is an explanatory drawing illustrating a diffraction pattern SP2' on a diffraction element 4 by the reflected light from a subspot SP2 on the optical disk.
FIG. 3(b) is an explanatory drawing illustrating a diffraction pattern SP1' on the diffraction element 4 by the reflected light from a main spot SP1 on the optical disk.
FIG. 3(c) is an explanatory drawing showing a diffraction pattern SP3' on the diffraction element 4 by the reflected light from a subspot SP3 on the optical disk.
Figure 3:
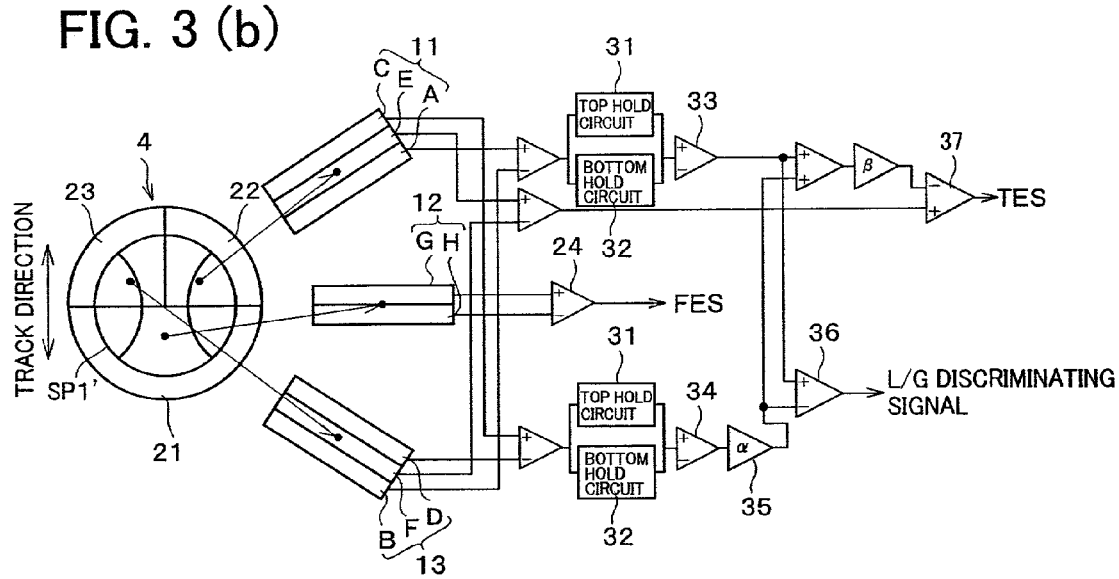
Figure 3:
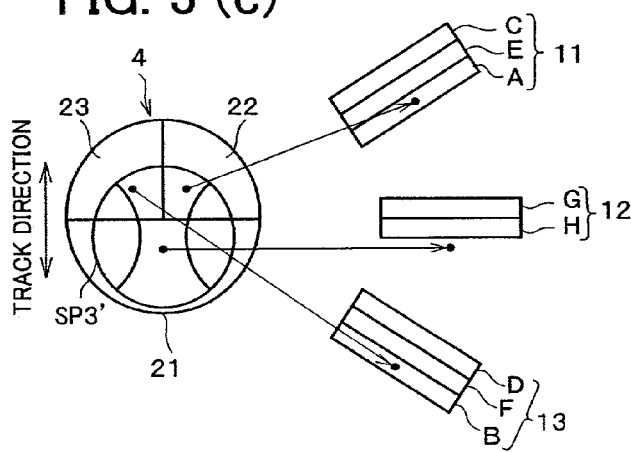

As shown in FIG. 2(b), the main spot SP1 and the subspots SP2 and SP3 are placed symmetrically on the optical disk 2, at the intervals approximately one-forth (P/4) of a track pitch in the radical direction. Here, L represents a land, while G represents a groove.

As shown in FIG. 3(a) through FIG. 3(c), the diffraction element 4 is divided into three regions, i.e., regions 21 to 23. The diffraction element 4 is divided equally into two regions, i.e., the region 21 and the other region (22+23) by a division line in the radial direction of the optical disk. Further, this other region is divided equally into the regions 22 and 23 by a division line in a direction parallel to the track direction.

FIG. 3(a) shows a diffraction pattern SP2' on the diffraction element 4 by the reflected light from the subspot SP2 on the optical disk 2. In the diffraction pattern SP2', among the diffracted light beams of the diffraction element 4, the diffracted light in the region 21 is not received by the light receiving elements. The diffracted light in the region 22 is received by a light receiving section C, which is one of the divided sections of the light receiving element 11, while the diffracted light in the region 23 is received by a light receiving section D, which is one of the divided sections of the light receiving element 13.

Next, FIG. 3(b) shows a diffraction pattern SP1' on the diffraction element 4 by the reflected light from the main spot SP1 on the optical disk 2. In the diffraction pattern SP1', among the diffracted light beams of the diffraction element 4, the diffracted light in the region 21 is converged onto the division line between light receiving sections G and H of the light receiving element 12. The diffracted light in the region 22 is received by a light receiving section E, which is one of the divided sections of the light receiving element 11, while the diffracted light in the region 23 is received by a light receiving section F, which is one of the divided sections of the light receiving element 13.

Furthermore, FIG. 3(c) shows a diffraction pattern SP3' on the diffraction element 4 by the reflected light from the subspot SP3 on the optical disk 2. In the diffraction pattern SP3', among the diffracted light beams of the diffraction element 4, the diffracted light in the region 21 is not received by the light receiving elements. The diffracted light in the region 22 is received by a light receiving section A, which is one of the divided sections of the light receiving element 11, while the diffracted light in the region 23 is received by a light receiving section B, which is one of the divided sections of the light receiving element 13.

Here, servo signals are found by the following operations:

FES=Gs-Hs $$TES=(Es-Fs)-\beta[(As-Bs)+\alpha(Cs-Ds)] \quad (3)$$

($\alpha$ and $\beta$ are constants)

L/G discriminating signal=(As-Bs)−$\alpha$(Cs-Ds)

(L/G: land/groove)

The FES (focus error signal) is a signal for detecting a direction (upward or downward) and an amount of movement of the objective lens 7 in the focus direction. The TES (tracking error signal) is a signal for detecting a direction (right or left) and an amount of movement of the objective lens 7 in the tracking direction.

First, the following will explain the FES. The diffracted light, shown in FIG. 3(b), detected by the light receiving sections G and H, is produced from the reflected light from the main spot SP1', which is diffracted in the region 21 of the diffraction element 4. The intensity of the diffracted light detected in the light receiving sections G and H usually becomes equivalent to the sum of the intensities of the diffracted light in regions 22 and 23. Therefore, the differential signal Gs-Hs calculated from the diffracted light in the region 21 can cancel a signal component which indicates a deviation of the main spot from the track. That is, the differential signal Gs-Hs can be used as an FES which is not affected by the optical disk 2. In other words, Gs-Hs is detected in accordance with the received diffracted light in the region 21, thereby obtaining an excellent FES.

Here, the FES is calculated in an operation circuit 24 (FES operating means) provided with an addition input terminal and a subtraction input terminal, in accordance with the output obtained from the converged light beam on the division line of the light receiving section 12 which detects diffracted light in the region 21, as shown in FIGS. 3(a) through 3(c).

Next, the following will explain TES.

In the above equation (3), $\beta$ is set to adjust an intensity ratio of the main spot SP1 to the subspots SP2 and SP3. Here, an example of a method for finding $\alpha$ is described below.

Figure 1:
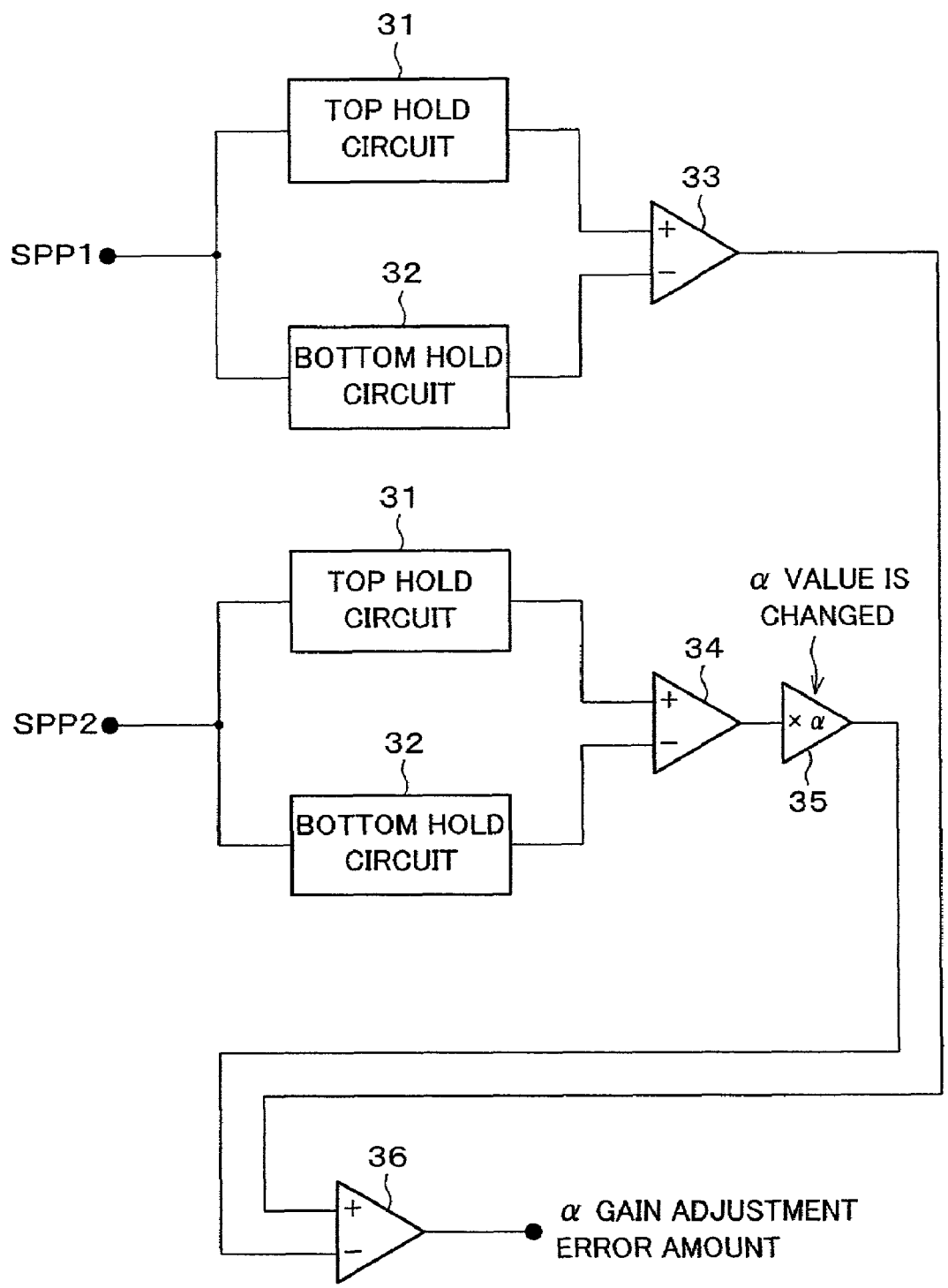
FIG. 1 is a block diagram illustrating a configuration of a tracking offset cancel circuit in an optical pickup device of the present invention.

FIG. 1 is a block diagram illustrating a circuit configuration for detecting a signal for determining $\alpha$ in an optical pickup device according to the present embodiment. This circuit is provided with a pair of operation circuits (push-pull signal generating means) 33 and 34, an operation circuit ($\alpha$ detecting means) 35, and an operation circuit (L/G operating means) 36. Each of the operation circuits 33 and 34 has an addition input terminal connected to a top hold circuit 31, and a subtraction input terminal connected to a bottom hold circuit 32. The operation circuit 35 is connected to an output terminal of the operation circuit 34. The operation circuit 36 has an addition input terminal connected to an output terminal of the operation circuit 33 and an subtraction input terminal connected to an output terminal of the operation circuit 35.

The $\alpha$ value is found by the following procedure. First, a laser beam from the optical pickup device is projected on the rotating optical disk 2, as shown in FIG. 2(a). Note that, the optical disk 2 is rotated by a spindle motor subject to servo control by a spindle servo system (not shown). After a focus servo controlled by a focus servo system (not shown) is turned on, a track moves in the radial direction by decentering and disk rotation of the optical disk 2. During the track movement, detection signals As to Hs are detected respectively from eight light receiving sections A to H on the light receiving elements 11 to 13, in accordance with the reflected light from the optical disk.

Next, in the light receiving elements 11 to 13 shown in FIG. 3(b), (As-Bs) is generated by a difference of detection signals of the light receiving sections A and B, and (Cs-Ds) is generated by a difference of detection signals of the light receiving sections C and D. (As-Bs) and (Cs-Ds) are supplied separately to the respective top hold circuit 31 and bottom hold circuit 32, as shown in FIG. 1. Note that, hereinafter (As-Bs) and (Cs-Ds) are referred to as push-pull signal SPP1 and SPP2, respectively.

In the present embodiment, when each of the operation circuits 33 and 34 calculate a top peak value and a bottom peak value in the top hold circuit 31 and bottom hold circuit 32, respectively, the operation circuit 35 ($\alpha$ detecting means) adjusts constant $\alpha$ so as to optimize the value of constant $\alpha$.

The top peak value held by the top hold circuit 31 is supplied to the addition input terminal of the operation circuit 33(34). Furthermore, the bottom peak value held by the bottom hold circuit 32 is supplied to the subtraction input terminal of the operation circuit 33(34). The operation circuit 33(34) subtracts the top peak value and the bottom peak value so as to detect AC amplitude of the push-pull signal SPP1 (SPP2). Next, the operation circuit 35 multiplies the AC amplitude of the push-pull signal SPP2 by an adjustable value of $\alpha$ (gain $\alpha$). The result of multiplication is compared with the AC amplitude of the push-pull signal SPP1, and the differential component is outputted as an $\alpha$ gain adjustment error amount (absolute value of the difference between SPP1 and $\alpha$SPP2) by the operation circuit 36.

Figure 14:
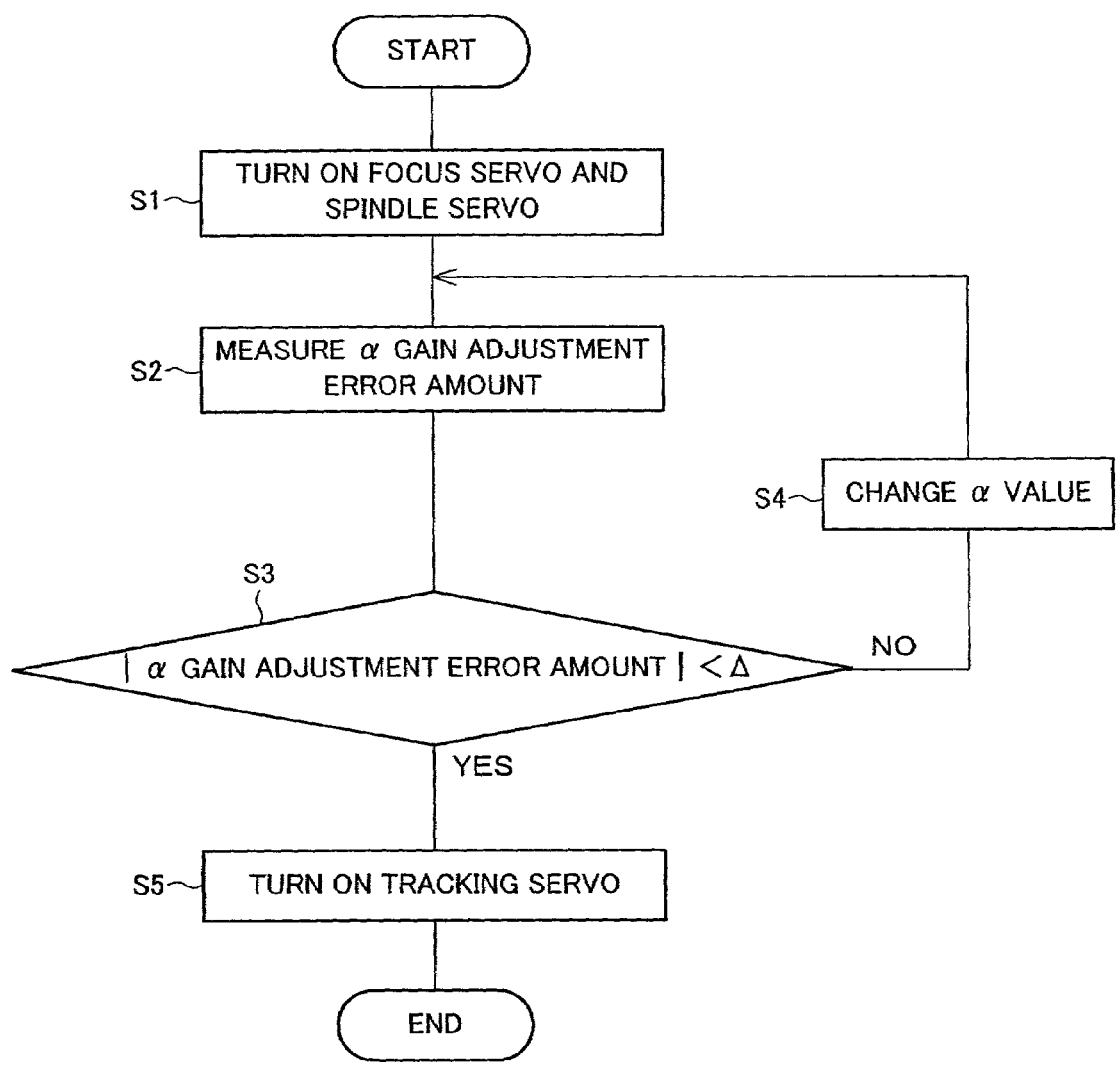
FIG. 14 is a flowchart showing other steps before tracking servo comes into operation with respect to the optical pickup device of the present invention.

FIG. 14 is a flowchart showing operations of determining the $\alpha$ value for canceling an offset of a tracking signal of the present embodiment.

First, the operation of the device gets started. Then, a system control circuit (not shown) instructs to start the focus servo and the spindle servo (S1). More specifically, a laser beam is projected on the optical disk rotated by the spindle motor which is subject to the servo control of the spindle servo system. Furthermore, the focus servo is performed by a focus coil of two-axis actuator controlled by the focus servo system (not shown).

Next, the system control circuit measures $\alpha$ gain adjustment error amount (S2). First, the operation circuit 35 shown in FIG. 1 adjusts the $\alpha$ value by multiplying the AC amplitude of the SPP2 generated by the operation circuit 34 by the initial value of $\alpha$ (for example, $\alpha$=1). Then, the system control circuit (not shown) measures the $\alpha$ gain adjustment error amount, which is the output of the operation of FIG. 1 by converting it from the analog value into the digital value with use of a device such as A/D converter.

After that, the system control circuit judges whether the absolute value of the $\alpha$ gain adjustment error amount falls in a previously specified tolerance $\Delta$ (S3). If the absolute value falls in the tolerance, the system control circuit instructs the tracking servo system to start tracking servo (S5). On the other hand, if the absolute value exceeds the tolerance $\Delta$, the $\alpha$ value is changed (S4), and the sequence of S3-S4 is repeatedly carried out until the absolute value of the $\alpha$ gain adjustment error amount falls in the previously specified tolerance $\Delta$. Note that, the predetermined tolerance $\Delta$ approximate to 0 is basically ideal, and it is preferably 5% or less of the maximum amplitude value of SPP1. However, 10% or less of the maximum amplitude value of SPP1 is acceptable as a tracking offset. That is, the previously specified tolerance $\Delta$ is an acceptable range of the tracking offset.

In this manner, $\alpha$ is changed under feedback control until the AC amplitudes of SPP1 and $\alpha$SPP2 become equal to each other, and $\alpha$ is fixed when the AC amplitudes of SPP1 and $\alpha$SPP2 become equal to each other. After the constant $\alpha$ is determined in such a procedure, the operation circuit (TES operating means) 37 as shown in FIG. 3(b) calculates TES, and tracking servo is carried out in this state.

Next, the principle of the servo signal detection is described by using the signal waveforms as shown in FIGS. 5(a) through 5(c). Each of (As-Bs), $\alpha$(Cs-Ds), (Es-Fs) has a signal waveform in the form of a sine wave, with a period of track pitch P. Since (As-Bs) and $\alpha$(Cs-Ds) are of the opposite phase and the absolute values of their signal amplitudes are substantially equal to each other as shown in FIG. 5(a), the result of the operation:

$$\beta[(As\text{-}Bs)+\alpha(Cs\text{-}Ds)] \quad (4)$$

includes only the tracking offset component because a signal component of (As-Bs) and a signal component of $\alpha$(Cs-Ds) are cancelled each other.

Thus, as shown in FIG. 3(a) and FIG. 3(c), even if a deviation of the projected positions of the subbeams causes a difference in output between (As-Bs) and (Cs-Ds), it is possible to equalize the signal amplitudes of the two subbeams.

Therefore, a tracking offset component can be completely cancelled in the above operation (3) in which the operation of (4) is subtracted from the push-pull signal Es-Fs having a tracking offset due to the main beam shown in FIG. 5(b).

As a result, since the TES has no offset, accurate tracking control can be performed. In addition, since (As-Bs) and $\alpha$(Cs-Ds) are of the opposite phase and the absolute values of their signal amplitudes are substantially equal to each other as shown in FIG. 5(a), the result of the operation (As-Bs)–$\alpha$(Cs-Ds) produces an accurate signal waveform having no phase difference, as is clear from FIG. 5(c). That is, the operation result of (As-Bs)–$\alpha$(Cs-Ds) is an excellent land/groove discriminating signal.

Next, the following will explain TES when an adjustment error occurs in positioning subbeams on the optical disk 2 when assembling and adjusting the pickup.

In an optical pickup device which is designed to project subbeams at the intervals of n/4 (n is odd number) of a track pitch, for example, one-forth (P/4) of the track pitch as shown in FIG. 6(a), or five-fourths (5P/4) of the track pitch as shown in FIG. 6(b), the following considers the case where projecting positions of the subbeams are adjusted so as to be shifted by $\delta$. Here, a principle of the above servo signal detection will be described by referring to the signal waveforms shown in FIGS. 7(a) through 7(c).

As shown in FIGS. 6(a) and 6(b), each of (As-Bs), $\alpha$(Cs-Ds), and (Es-Fs) has a signal waveform in the form of a sine wave, with a period of track pitch P.

Here, (As-Bs) and a(Cs-Ds) in the second term of the equation (3) for determining TES, have signal waveforms with substantially the same signal amplitude as that of the ideal waveform and have a phase difference of $\pm\gamma$ with respect to ideal waveform, as shown in FIG. 7(a). As a result, the result of the operation:

$$\beta[(As\text{-}Bs)+\alpha(Cs\text{-}Ds)] \quad (4)$$

includes a tracking offset component of (Es-Fs) and a slightly smaller component of the opposite phase from the tracking signal.

As a result, in the operation (3) in which the result of operation (4) is subtracted from the push-pull signal Es-Fs having a tracking offset due to the main beam in FIG. 7(b), the tracking offset component can be cancelled almost completely, and a push-pull signal of a slightly smaller signal amplitude is generated.

This means that the phase difference between the main beam push-pull signal and the subbeam push-pull signals due to an subbeam position adjustment error is cancelled by addition of the two subbeam push-pull signals having the same amplitude, thereby causing no additional residual offset.

Moreover, as shown in FIG. 7(c), though the signal amplitude of the L/G discriminating signal also becomes slightly smaller, as compared with the ideal signal amplitude, accurate land/groove discrimination can be performed because a phase difference, which had been generated conventionally, is eliminated. This makes it possible to perform excellent pull-in of the tracking servo.

Note that, in the present embodiment, although a pair of subspots is spaced by approximately one-forth of the track pitch symmetrically in the disk radial direction with respect to the main spot, the spacing is not limited to approximately one-forth of the track pitch. However, in the case of approximately half of the track pitch, (As-Bs) and α(Cs-Ds) becomes in-phase, which makes it difficult to extract the L/G discriminating signal.

Further, an optical pickup device according to the present invention for reproducing information from an optical disk having a track which is provided with a groove part which is a recessed part and a land part which is a raised part, in which a main spot of a zeroth-order light beam and one pair of subspots of ±first-order light beams are formed by irradiation of light on the optical disk, includes:

a first diffraction element which forms the main spot and the one pair of subspots which are placed symmetrically with respect to the main spot;

a second diffraction element which diffracts reflected light, from the optical disk, of the main spot and the one pair of subspots which are formed by the first diffraction element, the second diffraction element being divided by at least a division line in a parallel direction with the track;

a light receiving element including at least (a) light receiving sections (A and B) for detecting diffracted light of the +first-order light beam from regions which are provided by dividing the second diffraction element by a division line in a parallel direction with the track, and (b) light receiving sections (C and D) for detecting diffracted light of the –first-order light beam from regions which are provided by dividing the second diffraction element by a division line in a parallel direction with the track;

α detecting means for detecting such an α value that a difference in absolute value between (As-Bs) and α(Cs-Ds) falls in a preset range when outputs of the light receiving sections (A, B, C, and D) of the light receiving element are denoted as As, Bs, Cs, and Ds, respectively; and L/G operating means for operating (As-Bs)–α(Cs-Ds) (α is a constant) as a land/groove discriminating signal.

Note that, the pair of subspots may be placed symmetrically with respect to the main spot in the disk track direction.

The above arrangement makes it possible to remove a land/groove discriminating offset caused by a difference in size of push-pull signals between subspots which are generated by a divided diffraction grating in an optical pickup.

This makes it possible to perform accurate land/groove discrimination all the time in case of occurrence of an adjustment error of subbeam projection positions with respect to disk track, thereby realizing an excellent pull-in operation of the tracking servo.

Further, to solve the above problem, an optical pickup device according to the present invention for reproducing information from an optical disk having a track which is provided with a groove part which is a recessed part and a land part which is a raised part, in which a main spot of a zeroth-order light beam and one pair of subspots of ±first-order light beams are formed by irradiation of light on the optical disk, includes:

a first diffraction element which forms the main spot and the one pair of subspots which are placed symmetrically with respect to the main spot;

a second diffraction element which diffracts reflected light, from the optical disk, of the main spot and the one pair of subspots which are formed by the first diffraction element, the second diffraction element being divided by at least a division line in a parallel direction with the track;

a light receiving element including at least (a) light receiving sections (A and B) for detecting diffracted light of the +first-order light beam from regions which are provided by dividing the second diffraction element by a division line in a parallel direction with the track, (b) light receiving sections (C and D) for detecting diffracted light of the –first-order light beam from regions which are provided by dividing the second diffraction element by a division line in a parallel direction with the track, and (c) light receiving sections (E and F) for detecting diffracted light of the main spot from regions which are provided by dividing the second diffraction element by a division line in a parallel direction with the track;

α detecting means for detecting such an α value that a difference in absolute value between (As-Bs) and α(Cs-Ds) falls in a preset range when outputs of the light receiving sections (A, B, C, D, E, and F) of the light receiving element are denoted as As, Bs, Cs, Ds, Es, and Fs, respectively; and TES operating means for operating (Es-Fs)–β[(As-Bs)+α(Cs-Ds)] (α and β are constants) as a tracking error signal.

Note that, the pair of subspots may be placed symmetrically with respect to the main spot in the disk track direction.

The above arrangement makes it possible to remove a land/groove discriminating offset caused by a difference in size between push-pull signals of subspots which are generated by a three-part diffraction element in an optical pickup.

This makes it possible to generate an accurate tracking error signal all the time even in case of occurrence of an adjustment error of subbeam projection positions with respect to the disk track, thereby realizing an excellent tracking servo.

Still further, to achieve the above problem, the optical pickup device according to the present invention may have an arrangement such that the second diffraction element has a first region and a second region which are defined by a division line in an orthogonal direction with the track of the optical disk, the first region has two regions which are defined by a division line in a parallel direction with the track, and diffracted light from the second region defined by the division line in the orthogonal direction with the track of the optical disk is detected as a focus error signal.

In the above arrangement, the second diffraction element is divided into two regions by a division line in the orthogonal direction with the track of the optical disk, and one of these regions thus divided is further divided into two regions by a division line in the parallel direction with the track. That is, the second diffraction element is divided into three regions.

With this arrangement, a signal component in accordance with diffracted light in the other region which is divided by the division line in the orthogonal direction with the track direction of the disk becomes equivalent to the sum of signal components in accordance with diffracted light in the two the regions defined by the division line in the parallel direction with the track of the disk for detecting a push-pull signal.

Further, it is possible to cancel a push-pull signal component by detecting a signal component in accordance with diffracted light in the other region. That is, the signal component in accordance with the diffracted light in the other region becomes a focus error signal (FES) which is not affected by the track of the optical disk.

With the above arrangement, it is possible to provide the optical pickup device which enables detection of a focus error signal which is not affected by the track of the optical disk.

Still further, the optical pickup device according to the present invention may include:

a light receiving element including two light receiving sections (G and H), which are next to each other, detecting the diffracted light from the second region which is defined by the division line in the orthogonal direction with the track of the optical track; and FES operating means for operating Gs-Hs as the focus error signal, where outputs of the light receiving sections (G and H) of the light receiving element are denoted as Gs and Hs, respectively.

With this, when the two light receiving sections, next to each other, of the light receiving element detects diffracted light of the main spot in the other region of the second diffraction element which is defined by a division line in the orthogonal direction with the track, and when the outputs of those two light receiving sections are denoted as Hs and Gs, respectively, it is possible to detect a focus error signal (FES) by a Foucault method by calculating a difference between Hs and Gs.

Further, by regarding such an operation result as a focus error signal, it is possible to detect three kinds of signals: focus error signal; land/groove discriminating signal; and tracking error signal, with a substantially integrated detection system (diffraction element and light receiving element).

The above arrangement makes it possible to obtain a highly reliable detection system which does not require minimizing adjustment error of the subbeams in assembly, thereby simplifying assembly of the optical pickup device and lowering manufacturing cost.

Note that, the top hold circuit 31 is the circuit for holding at a predetermined sampling timing a top peak value of a traverse signal which indicates an AC component included in the push-pull signal SPP1 (SPP2). The bottom hold circuit 32 is the circuit for holding, at the same sampling timing as the top hold circuit 31, a bottom peak value of the traverse signal which indicates an AC component included in the push-pull signal SPP1 (SPP2). Note that, to the top hold circuit 31 and the bottom hold circuit 32 are inputted continuous signals having an AC amplitude for sampling all the time. In addition, by "hold", it means that a peak value is held until a subsequent input value exceeds this peak value, so as to constantly renew the peak value.

Figure 4:
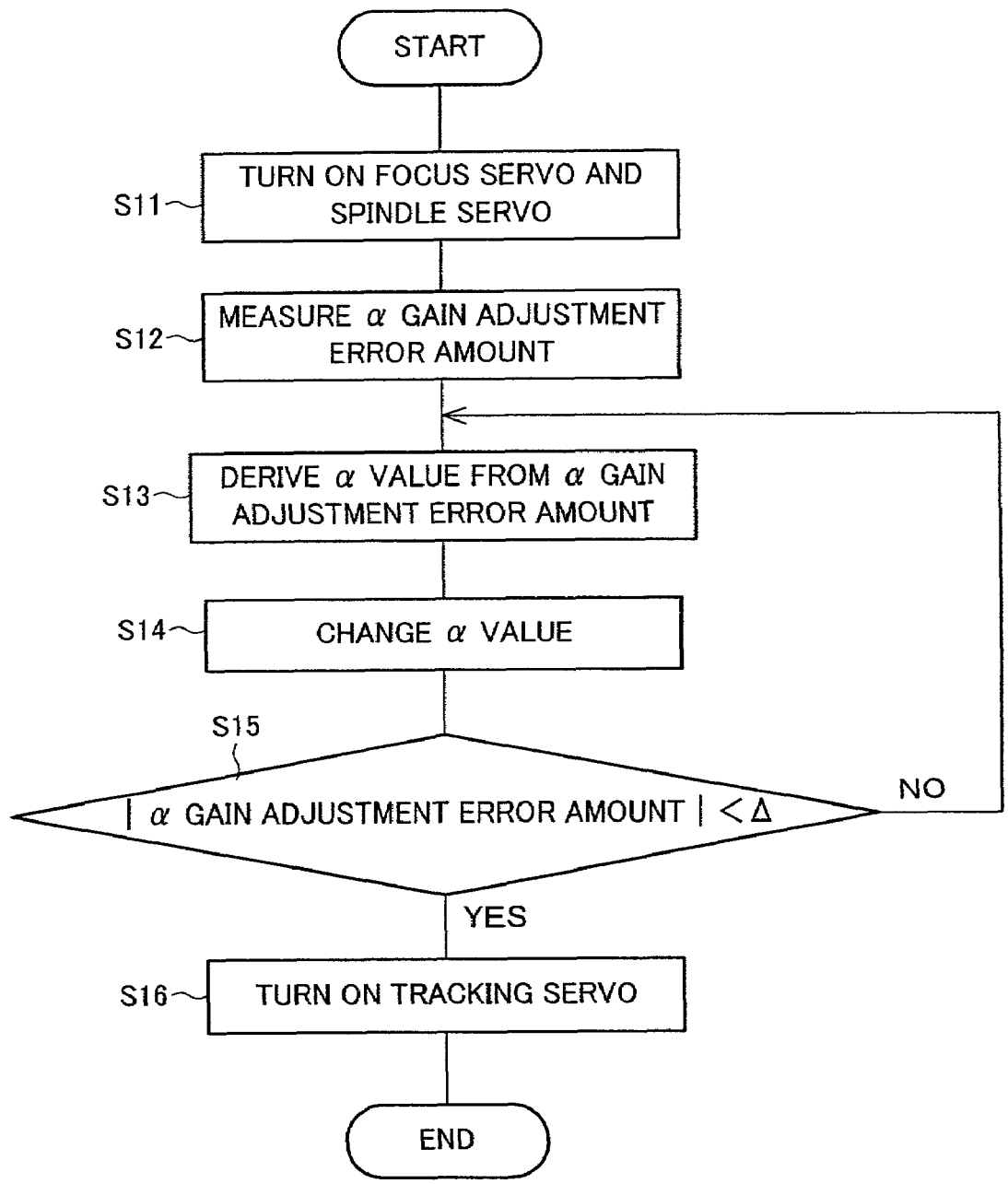
FIG. 4 is a flowchart showing steps before tracking servo comes into operation with respect to the optical pickup device of the present invention.
Figure 5:
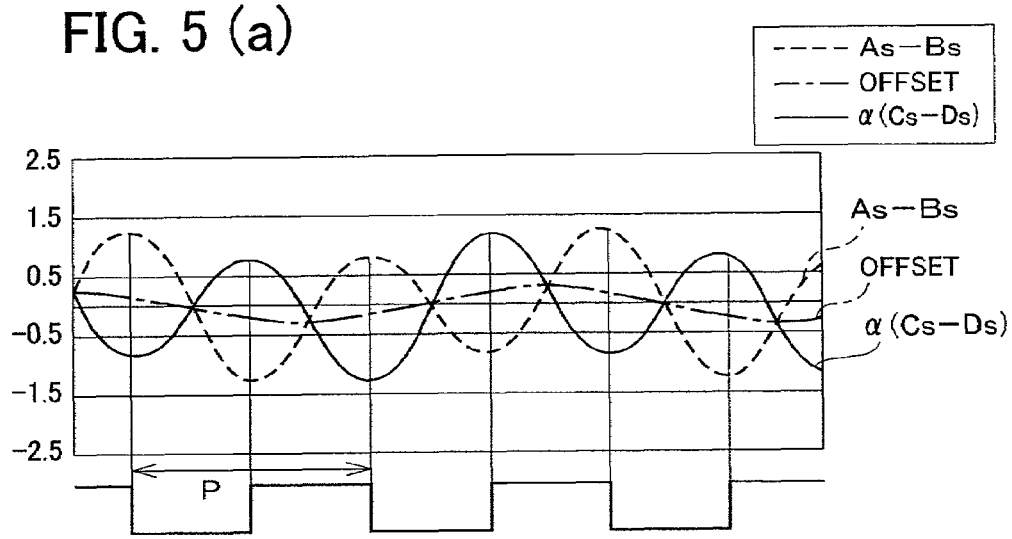
Figure 5:
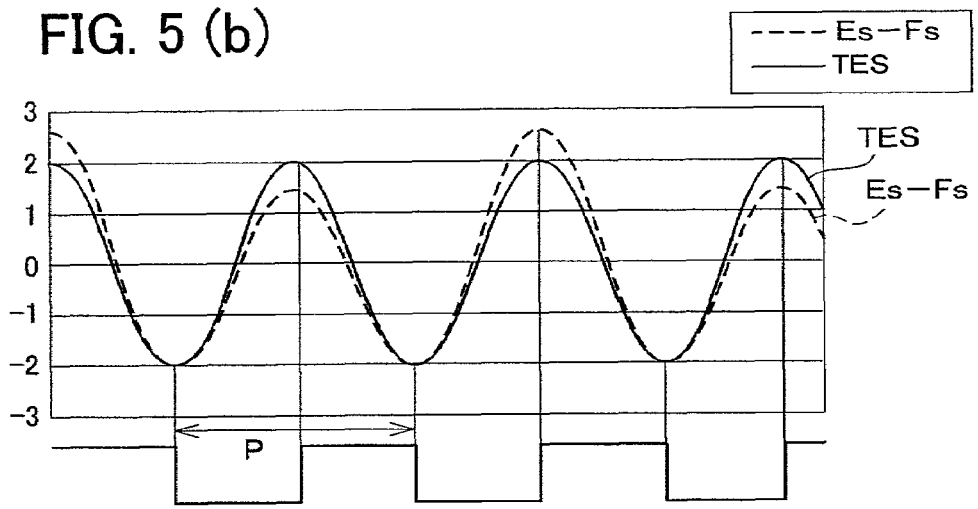
Figure 5:
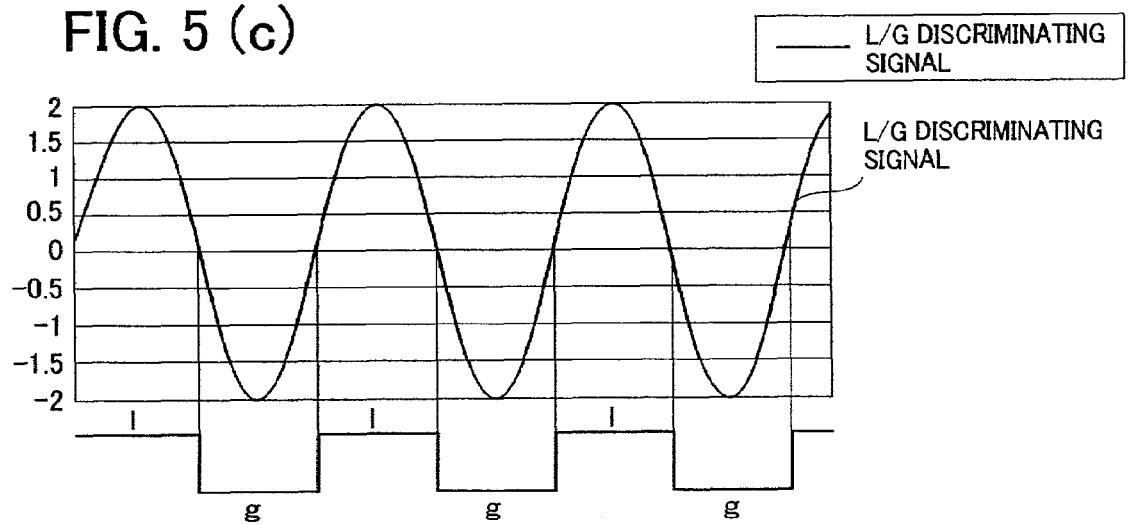
Figure 6:
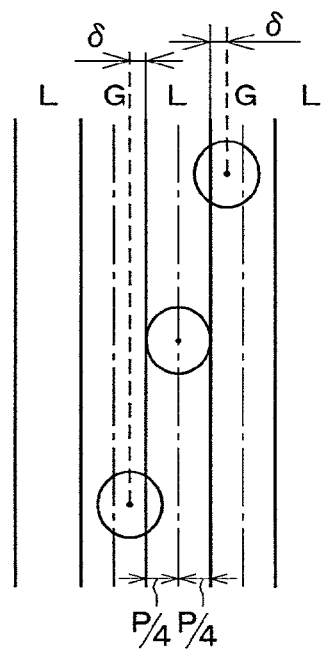
Figure 6:
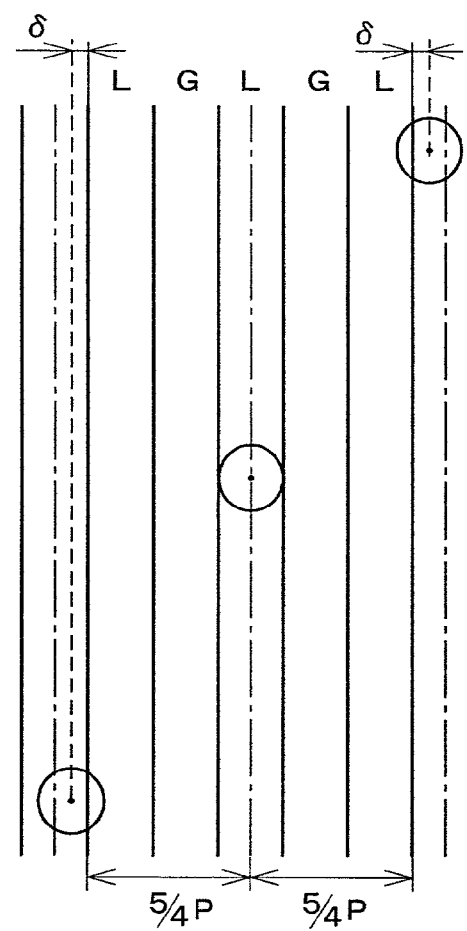
Figure 7:
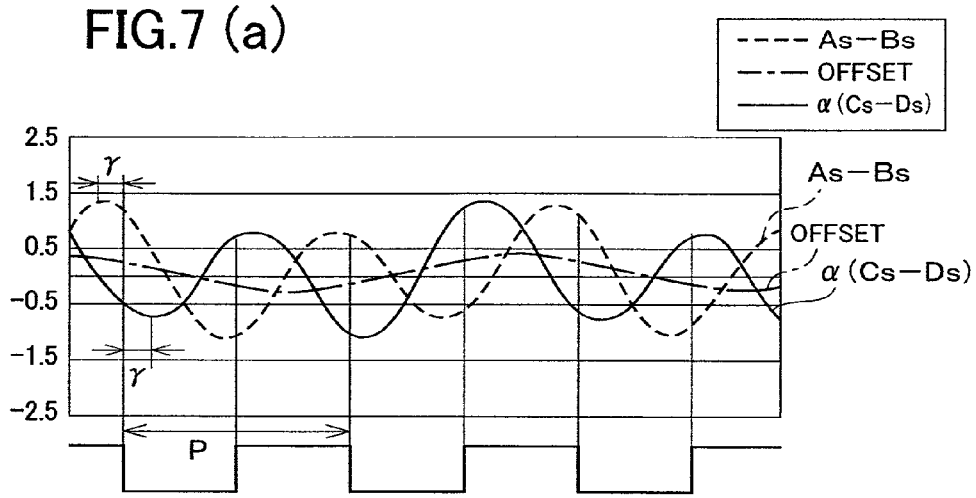
Figure 7:
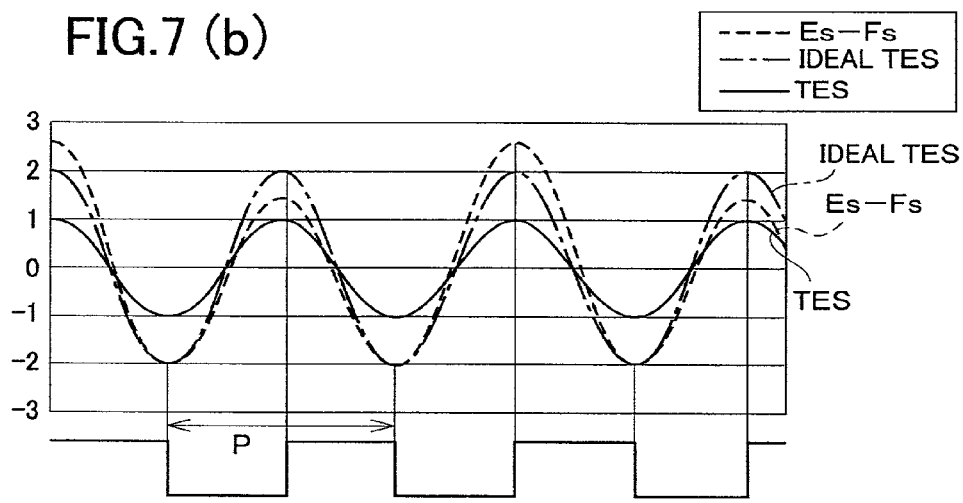
Figure 7:
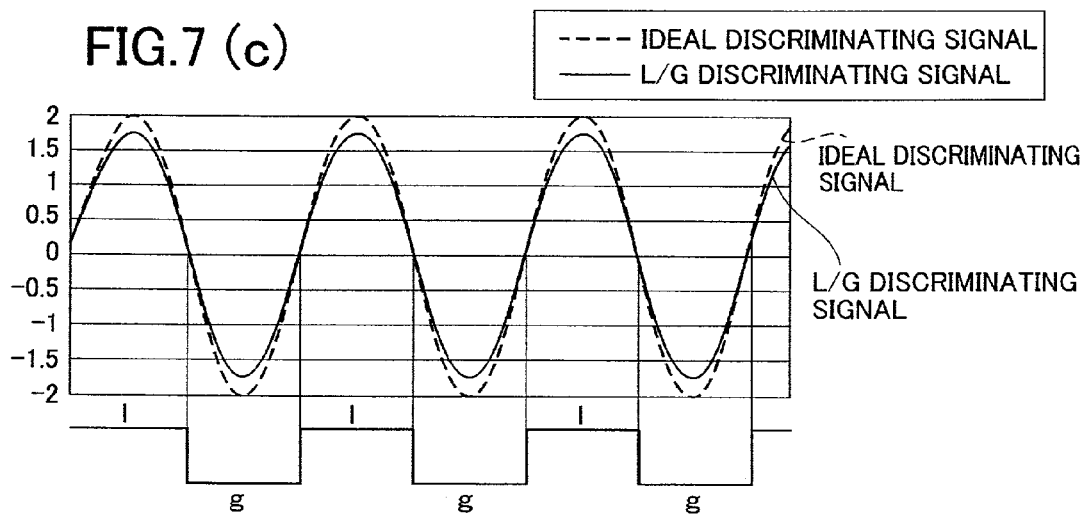
Figure 8:
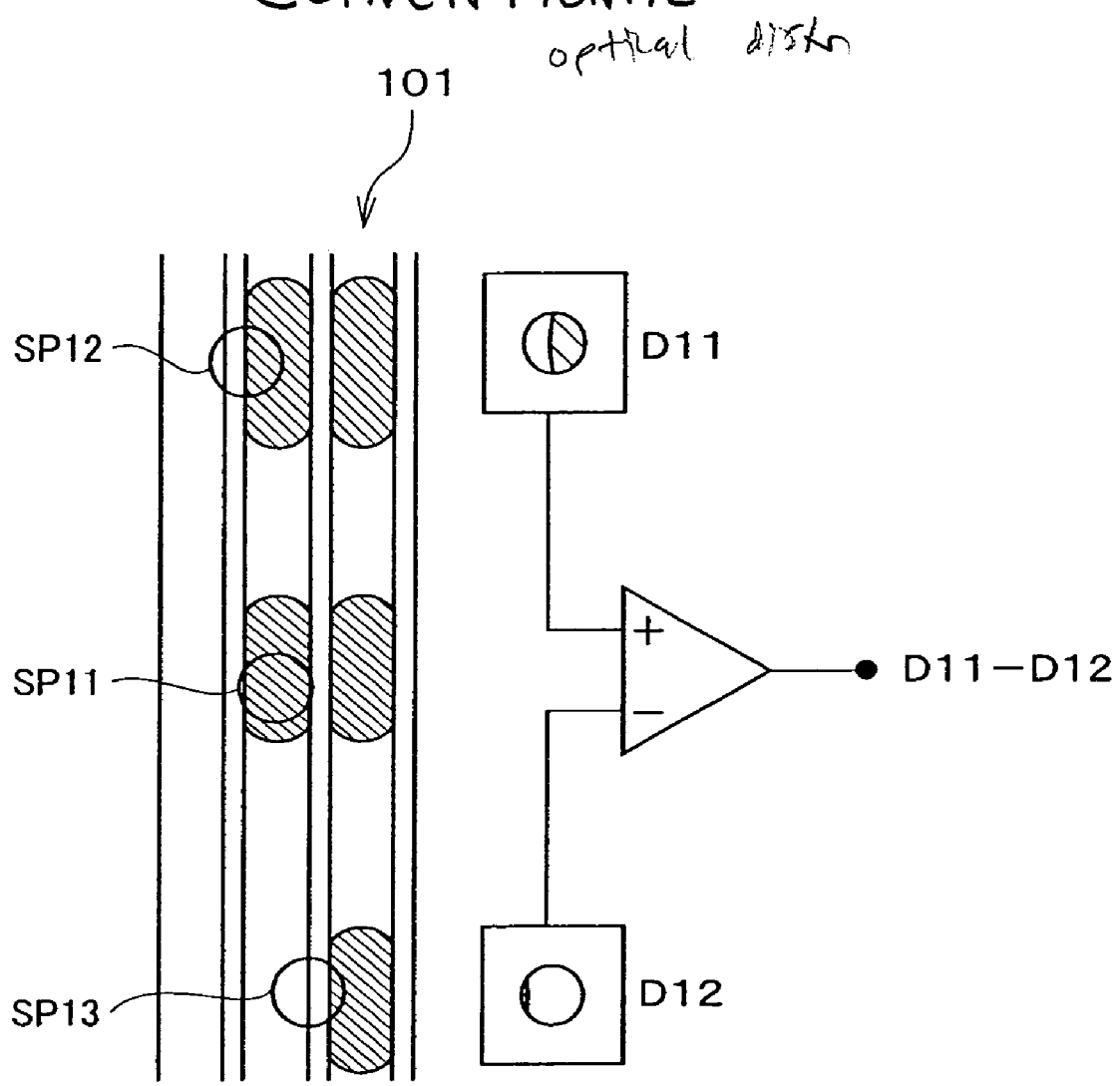
FIG. 8 is an explanatory drawing illustrating signal detection by a three-beam method in a conventional optical pickup device.

Further, the operation to determine an α value for canceling offset of a tracking error signal may alternatively be performed according to the following procedure. Referring to FIG. 4, such a procedure is explained below.

First, the operation of the device gets started. Then, a system control circuit (not shown) instructs to start the focus servo and the spindle servo (S11). More specifically, a laser beam is projected from the optical pickup device on the optical disk rotated by the spindle motor which is subject to the servo control of the spindle servo system. Furthermore, a focus servo is performed by a focus coil of a two-axis actuator controlled by the focus servo system (not shown).

Next, the system control circuit measures α gain adjustment error amount as shown in FIG. 1 (S12). The operation circuit 35 adjusts the α value by multiplying SPP2 generated by the operation circuit 34 by an α initial value (for example, α=1). Then, the system control circuit (not shown) measures the α gain adjustment error amount, which is an operation output shown in FIG. 1, by converting it from analog value into digital value with use of a device such as A/D converter.

Furthermore, the system control circuit derives an optimum gain value from the level of the α gain adjustment error amount (S13). The system control circuit outputs a gain value in accordance with the signal level of the α gain adjustment error amount. The gain value is the value for harmonizing the AC amplitude of the push-pull signal SPP2 with the AC amplitude of the push-pull signal SPP1. Then, the α value is changed (S14), and the α gain adjustment error amount is outputted according to the setting after the change of α value.

After that, the system control circuit judges whether the absolute value of α gain adjustment error amount falls in a previously specified tolerance Δ (S15). If the absolute value falls in the tolerance Δ, the system control circuit instructs the tracking servo system to start tracking servo (S16). On the other hand, if the absolute value exceeds the tolerance Δ, the sequence of S13–S15 is similarly repeated until the absolute value of α gain adjustment error amount falls in the previously specified tolerance Δ. Note that, the predetermined tolerance Δ approximate to 0 is basically ideal, and it is preferably 5% or less of the maximum amplitude value of SPP1. However, 10% or less of the maximum amplitude value of SPP1 is acceptable as a tracking offset. That is, the previously specified tolerance Δ is an acceptable range of the tracking offset.

Moreover, the signal (main spot push-pull signal: MPP) detected by the light receiving sections H and G shown in FIG. 3(b) is the signal in accordance with the diffracted light in the region 21 which is defined by a division line in the orthogonal direction with the track direction of the optical disk 2. The foregoing signal is equivalent to the sum of the signals in accordance with the diffracted light in regions 22 and 23 which are defined by a division line in the parallel direction with the track of the disk for detecting a push-pull signal. Therefore, the diffracted light in the region 21 can cancel a push-pull signal component, so that it can be used as a FES which is not affected by the track of the optical disk 2, thus detecting an excellent FES from the diffracted light in the region 21.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An optical pickup device for reproducing information from an optical disk having a track which is provided with a groove part which is a recessed part and a land part which is a raised part, in which one main spot, a first subspot, and a second subspot are formed by irradiation of light on the optical disk, said optical pickup device comprising:

means for generating a push-pull signal which indicates a deviation between each of said spots and the track; and α selecting means for selecting a value of a variable α such that $|SPP1-\alpha SPP2|<\Delta$, where Δ is a value corresponding to a preset range, SPP1 is a push-pull signal of said first subspot, and SPP2 is a push-pull signal of said second subspot, wherein:

SPP1−αSPP2 is a land/groove discriminating signal, wherein α is fixed as the value selected by said α selecting means.

2. The optical pickup device according to claim 1, wherein said a selecting means comprises:

a system control circuit for measuring an α gain adjustment error amount given by SPP1−αSPP2 for a trial value of α, and determining whether said trial value of α satisfies |SPP1−αSPP2|<Δ, wherein when said trial value of α does not satisfy |SPP1−αSPP2|<Δ, said system control circuit iteratively adjusts said trial value of a based on said a gain adjustment error amount until |SPP1−αSPP2|<Δ.

3. The optical pickup device according to claim 2, wherein said system control circuit comprises:

a first top hold circuit and a first bottom hold circuit for respectively holding maximum and minimum AC values of SPP1, a second top hold circuit and a second bottom hold circuit for respectively holding maximum and minimum AC values of SPP2, a first operation circuit for receiving the values held by the first top hold circuit and the first bottom hold circuit, and outputting a difference between the values held by the first top hold circuit and the first bottom hold circuit, a second operation circuit for receiving the values held by the second top hold circuit and the second bottom hold circuit, and outputting a difference between the values held by the second top hold circuit and the second bottom hold circuit, a third operation circuit for receiving the output of the second operation circuit said trial value of α, and outputting the result of multiplying the output of the second operation circuit by said trial value of α, a fourth operation circuit for receiving the outputs of the first and third operation circuits, and outputting a difference between the outputs of the first and third operation circuits as said α gain adjustment error amount.

4. An optical pickup device for reproducing information from an optical disk having a track which is provided with a groove part which is a recessed part and a land part which is a raised part, in which one main spot, a first subspot, and a second subspot are formed by irradiation of light on the optical disk, said optical pickup device comprising:

means for generating a push-pull signal which indicates a deviation between each of said spots and the track; and α selecting means for selecting a value of a variable α such that |SPP1−αSPP2|<Δ, where Δ is a value corresponding to a preset range, a push-pull signal of said main spot is MPP, SPP1 is a push-pull signal of said first subspot, SPP2 is a push-pull signal of said second subspot, wherein:

MPP−β(SPP1+αSPP2) is a tracking error signal, wherein α is fixed as the value selected by said α selecting means and β represents an intensity ratio of said main spot to said first and second subspots.

5. The optical pickup device according to claim 4, wherein said a selecting means comprises:

a system control circuit for measuring an α gain adjustment error amount given by SPP1−αSPP2 for a trial value of α, and determining whether said trial value of α satisfies |SPP1−αSPP2|<Δ, wherein when said trial value of α does not satisfy |SPP1−αSPP2|<Δ, said system control circuit iteratively adjusts said trial value of α based on said α gain adjustment error amount until |SPP1−αSPP2|<Δ.

6. The optical pickup device according to claim 5, wherein said system control circuit comprises:

a first top hold circuit and a first bottom hold circuit for respectively holding maximum and minimum AC values of SPP1, a second top hold circuit and a second bottom hold circuit for respectively holding maximum and minimum AC values of SPP2, a first operation circuit for receiving the values held by the first top hold circuit and the first bottom hold circuit, and outputting a difference between the values held by the first top hold circuit and the first bottom hold circuit, a second operation circuit for receiving the values held by the second top hold circuit and the second bottom hold circuit, and outputting a difference between the values held by the second top hold circuit and the second bottom hold circuit, a third operation circuit for receiving the output of the second operation circuit said trial value of α, and outputting the result of multiplying the output of the second operation circuit by said trial value of α, a fourth operation circuit for receiving the outputs of the first and third operation circuits, and outputting a difference between the outputs of the first and third operation circuits as said α gain adjustment error amount.

7. An optical pickup device for reproducing information from an optical disk having a track which is provided with a groove part which is a recessed part and a land part which is a raised part, in which a main spot of a zeroth-order light beam and one pair of subspots of ±first-order light beams are formed by irradiation of light on the optical disk, said optical pickup device comprising:

a first diffraction element which forms said main spot and said one pair of subspots which are placed symmetrically with respect to said main spot;

a second diffraction element which diffracts reflected light, from the optical disk, of said main spot and said one pair of subspots which are formed by said first diffraction element, said second diffraction element being divided by at least a division line in a parallel direction with the track;

a light receiving element including at least (a) light receiving sections (A and B) for detecting diffracted light of the +first-order light beam from regions which are provided by dividing said second diffraction element by a division line in a parallel direction with the track, and (b) light receiving sections (C and D) for detecting diffracted light of the −first-order light beam from regions which are provided by dividing said second diffraction element by a division line in a parallel direction with the track;

α selecting means for selecting a value of a variable α such that a difference in absolute value between (As−Bs) and α(Cs−Ds) falls in a preset range when outputs of the light receiving sections (A, B, C, and D) of said light receiving element are denoted as As, Es, Cs, and Ds, respectively; and L/G operating means for operating $(As-Es)-\alpha(Cs-Ds)$ as a land/groove discriminating signal, wherein $\alpha$ is fixed as the value selected by said $\alpha$ selecting means.

8. The optical pickup device according to claim 7, wherein said second diffraction element has a first region and a second region which are defined by a division line in an orthogonal direction with the track of the optical disk, the first region has two regions which are defined by a division line in a parallel direction with the track, and diffracted light from the second region defined by the division line in the orthogonal direction with the track of the optical disk is detected as a focus error signal.

9. The optical pickup device according to claim 8, comprising:

a light receiving element including two light receiving sections (G and H), which are next to each other, detecting the diffracted light from the second region which is defined by the division line in the orthogonal direction with the track of the optical track; and FES operating means for operating Gs-Hs as the focus error signal, where outputs of the light receiving sections (G and H) of said light receiving element are denoted as Gs and Hs, respectively.

10. The optical pickup device according to claim 7, wherein said $\alpha$ selecting means comprises:

a system control circuit for measuring an $\alpha$ gain adjustment error amount given by $SPP1-\alpha SPP2$ for a trial value of $\alpha$, and determining whether said trial value of $\alpha$ satisfies $|SPP1-\alpha SPP2|<\Delta$, wherein when said trial value of a does not satisfy $|SPP1-\alpha SPP2|<\Delta$, said system control circuit iteratively adjusts said trial value of $\alpha$ based on said $\alpha$ gain adjustment error amount until $|SPP1-\alpha SPP2|<\Delta$.

11. The optical pickup device according to claim 10, wherein said system control circuit comprises:

a first top hold circuit and a first bottom hold circuit for respectively holding maximum and minimum AC values of SPP1, a second top hold circuit and a second bottom hold circuit for respectively holding maximum and minimum AC values of SPP2, a first operation circuit for receiving the values held by the first top hold circuit and the first bottom hold circuit, and outputting a difference between the values held by the first top hold circuit and the first bottom hold circuit, a second operation circuit for receiving the values held by the second top hold circuit and the second bottom hold circuit, and outputting a difference between the values held by the second top hold circuit and the second bottom hold circuit, a third operation circuit for receiving the output of the second operation circuit said trial value of $\alpha$, and outputting the result of multiplying the output of the second operation circuit by said trial value of $\alpha$, a fourth operation circuit for receiving the outputs of the first and third operation circuits, and outputting a difference between the outputs of the first and third operation circuits as said $\alpha$ gain adjustment error amount.

12. An optical pickup device for reproducing information from an optical disk having a track which is provided with a groove part which is a recessed part and a land part which is a raised part, in which a main spot of a zeroth-order light beam and one pair of subspots of ±first-order light beams are formed by irradiation of light on the optical disk, said optical pickup device comprising:

a first diffraction element which forms said main spot and said one pair of subspots which are placed symmetrically with respect to said main spot;

a second diffraction element which diffracts reflected light, from the optical disk, of said main spot and said one pair of subspots which are formed by said first diffraction element, said second diffraction element being divided by at least a division line in a parallel direction with the track;

a light receiving element including at least (a) light receiving sections (A and B) for detecting diffracted light of the +first-order light beam from regions which are provided by dividing said second diffraction element by a division line in a parallel direction with the track, (b) light receiving sections (C and D) for detecting diffracted light of the −first-order light beam from regions which are provided by dividing said second diffraction element by a division line in a parallel direction with the track, and (c) light receiving sections (E and F) for detecting diffracted light of the main spot from regions which are provided by dividing said second diffraction element by a division line in a parallel direction with the track;

$\alpha$ selecting means for selecting a value of a variable $\alpha$ such that a difference in absolute value between $(As-Bs)$ and $\alpha(Cs-Ds)$ falls in a preset range when outputs of the light receiving sections (A, B, C, D, E, and F) of said light receiving element are denoted as As, Bs, Cs Ds_Es, and Fs, respectively; and TES operating means for operating $(Es-Fs)-\beta[(As-Bs)+\alpha(Cs-Ds)]$ as a tracking error signal, wherein $\alpha$ is fixed as the value selected by said $\alpha$ selecting means and $\beta$ represents an intensity ratio of said main spot to said first and second subspots.

13. The optical pickup device according to claim 12, wherein said second diffraction element has a first region and a second region which are defined by a division line in an orthogonal direction with the track of the optical disk, the first region has two regions which are defined by a division line in a parallel direction with the track, and diffracted light from the second region defined by the division line in the orthogonal direction with the track of the optical disk is detected as a focus error signal.

14. The optical pickup device according to claim 13, comprising:

a light receiving element including ;two light receiving sections (G and H), which are next to each other, detecting the diffracted light from the second region which is defined by the division line in the orthogonal direction with the track of the optical track; and FES operating means for operating Gs-Hs as the focus error signal, where outputs of the light receiving sections (G and H) of said light receiving element are denoted as Gs and Hs, respectively.

light beams are formed by irradiation of light on the optical disk, said optical pickup device comprising:

a first diffraction element which forms said main spot and said one pair of subspots which are placed symmetrically with respect to said main spot;

a second diffraction element which diffracts reflected light, from the optical disk, of said main spot and said one pair of subspots which are formed by said first diffraction element, said second diffraction element being divided by at least a division line in a parallel direction with the track;

a light receiving element including at least (a) light receiving sections (A and B) for detecting diffracted light of the +first-order light beam from regions which are provided by dividing said second diffraction element by a division line in a parallel direction with the track, (b) light receiving sections (C and D) for detecting diffracted light of the −first-order light beam from regions which are provided by dividing said second diffraction element by a division line in a parallel direction with the track, and (c) light receiving sections (E and F) for detecting diffracted light of the main spot from regions which are provided by dividing said second diffraction element by a division line in a parallel direction with the track;

α selecting means for selecting a value of a variable α such that a difference in absolute value between (As-Bs) and α(Cs-Ds) falls in present range when outputs of the light receiving sections (A, B, C, D, E, and F) of said light receiving element are denoted as As, Bs, Cs, Ds, Es, and Fs, respectively; and TES operating means for operating (Es-Fs)−β[(As-Bs)+α(Cs-Ds)] as a tracking error signal, where α is fixed as the value selected by said α selecting means and β represents an intensity ratio of said main spot to said first and second subspots.

15. The optical pickup device according to claim 12, wherein said α selecting means comprises:

a system control circuit for measuring an α gain adjustment error amount given by SPP1−αSPP2 for a trial value of α, and determining whether said trial value of α satisfies |SPP1−αSPP2|<Δ, wherein when said trial value of α does not satisfy |SPP1−αSPP2|<Δ, said system control circuit iteratively adjusts said trial value of α based on said α gain adjustment error amount until |SPP1−αSPP2|<Δ.

16. The optical pickup device according to claim 15, wherein said system control circuit comprises:

a first top hold circuit and a first bottom hold circuit for respectively holding maximum and minimum AC values of SPP1, a second top hold circuit and a second bottom hold circuit for respectively holding maximum and minimum AC values of SPP2, a first operation circuit for receiving the values held by the first top hold circuit and the first bottom hold circuit, and outputting a difference between the values held by the first top hold circuit and the first bottom hold circuit, a second operation circuit for receiving the values held by the second top hold circuit and the second bottom hold circuit, and outputting a difference between the values held by the second top hold circuit and the second bottom hold circuit, a third operation circuit for receiving the output of the second operation circuit said trial value of α, and outputting the result of multiplying the output of the second operation circuit by said trial value of α, a fourth operation circuit for receiving the outputs of the first and third operation circuits, and outputting a difference between the outputs of the first and third operation circuits as said α gain adjustment error amount.

* * * * *